US012231897B2

(12) United States Patent
Zeng

(10) Patent No.: US 12,231,897 B2
(45) Date of Patent: Feb. 18, 2025

(54) PASSWORD-FREE USABLE AND SECURE PAIRING OF IoT DEVICES

(71) Applicant: UNIVERSITY OF SOUTH CAROLINA, Columbia, SC (US)

(72) Inventor: Qiang Zeng, West Columbia, SC (US)

(73) Assignee: UNIVERSITY OF SOUTH CAROLINA, Columbia, SC (US)

( * ) Notice: Subject to any disclaimer, the term of this patent is extended or adjusted under 35 U.S.C. 154(b) by 413 days.

(21) Appl. No.: 17/691,697

(22) Filed: Mar. 10, 2022

(65) Prior Publication Data
US 2022/0377560 A1 Nov. 24, 2022

Related U.S. Application Data

(60) Provisional application No. 63/251,317, filed on Oct. 1, 2021, provisional application No. 63/188,066, filed on May 13, 2021.

(51) Int. Cl.
H04W 12/50 (2021.01)
(52) U.S. Cl.
CPC .................................. H04W 12/50 (2021.01)
(58) Field of Classification Search
CPC ... H04W 12/50; H04W 12/069; H04W 12/33; H04W 12/61; H04W 12/63; H04W 12/68; H04W 84/12; H04L 63/0869
See application file for complete search history.

(56) References Cited

U.S. PATENT DOCUMENTS

| | | | | |
|---|---|---|---|---|
| 8,886,316 B1* | 11/2014 | Juels | ..................... | A61B 5/0031 607/30 |
| 9,589,397 B1* | 3/2017 | Christopher | .......... | H04W 12/06 |
| 11,531,390 B1* | 12/2022 | Canberk | ................. | G06F 18/22 |
| 2013/0263240 A1* | 10/2013 | Moskovitch | ........ | H04L 63/0861 726/7 |
| 2018/0007553 A1* | 1/2018 | Dutt | ........................ | G06F 21/32 |
| 2018/0357407 A1* | 12/2018 | Yous | ....................... | G06F 16/29 |

(Continued)

OTHER PUBLICATIONS

Ahmed et al., Checksum Gestures: Continuous Gestures as an Out-of-Band Channel for Secure Pairing, UbiComp '15: Proceedings of the 2015 ACM International Joint Conference on Pervasive and Ubiquitous Computing, 2015, pp. 391-401. (Abstract Only) https://doi.org/10.1145/2750858.2807521.

(Continued)

Primary Examiner — Khalid M Almaghayreh
(74) Attorney, Agent, or Firm — DORITY & MANNING, P.A.

(57) ABSTRACT

Internet of Things (IoT) devices lack conventional user interfaces, such as keyboards and displays, which make many traditional pairing approaches inapplicable. Proximity-based pairing approaches are very usable, but can be exploited by co-located malicious devices. A secure and usable pairing approach that can be applied to heterogeneous IoT devices still does not exist. The presently disclosed Universal Operation Sensing allows an IoT device to sense the user's physical operations on it without requiring inertial sensors. With this technique, a user holding a smartphone or wearing a wristband can finish pairing in seconds through some very simple operations, e.g., pressing a button or twisting a knob. A presently disclosed pairing protocol uses faithful fuzzy commitment, which is secure and usable.

8 Claims, 20 Drawing Sheets

(56) References Cited

U.S. PATENT DOCUMENTS

| | | | |
|---|---|---|---|
| 2019/0220583 A1* | 7/2019 | Douglas | G06V 40/70 |
| 2021/0056786 A1* | 2/2021 | De La Garza | H04W 4/029 |
| 2021/0176317 A1* | 6/2021 | Yeoh | G06F 40/20 |
| 2021/0215789 A1* | 7/2021 | Hu | G01S 7/415 |
| 2022/0012672 A1* | 1/2022 | Inman | G06Q 10/1053 |
| 2022/0022038 A1* | 1/2022 | Nadi | G06N 20/00 |
| 2022/0335764 A1* | 10/2022 | Imanuel | G07C 9/22 |

OTHER PUBLICATIONS

Amazon, AWS IoT Button, Cloud Programmable Dash Button. Retrieved Mar. 1, 2023 from weblink https://aws.amazon.com/iotbutton/.

Anand et al., A Sound for a Sound: Mitigating Acoustic Side Channel Attacks on Password Keystrokes with Active Sounds, FC 2016: Financial Cryptography and Data Security, vol. 9603, 2017. (Abstract Only) https://doi.org/10 1007/978-3-662-54970-4_21.

Anand et al., Noisy Vibrational Pairing of IoT Devices, IEEE Transactions on Dependable and Secure Computing, vol. 16, Issue 3, 2019, pp. 530-545. (Abstract Only) https://doi.org/10.1109/TDSC.2018.2873372.

Bellovin et al., Encrypted Key Exchange: Password-Based Protocols Secure Against Dictionary Attacks, Proceedings of the IEEE Symposium on Research in Security and Privacy, Oakland, 1992, 13 Pages. https://www.cs.columbia.edu/~smb/papers/neke.pdf.

Bonneau et al., The Quest to Replace Passwords: A Framework for Comparative Evaluation of Web Authentication Schemes, 2012 IEEE Symposium on Security and Privacy, 2012, Oakland, 553-557. https://www.cl.cam.ac.uk/~fms27/papers/2012-BonneauHerOorSta-password--oakland.pdf.

Borghi, Distribution of Human Reaction Time, Perceptual and Motor Skills, vol. 1, 1965m 212-214. (Abstract Only) https://doi.org/10.2466/pms.1965.21.1.212.

Boyko et al., Provably Secure Password-Authenticated Key Exchange Using Diffie-Hellman, International Conference on the Theory and Applications of Cryptographic Techniques, Eurocrypt 2000: Advances in Cryptology, 16 Pages. https://link.springer.com/chapter/10.1007/3-540-45539-6_12.

Brooke, Sus: A Quick and Dirty Usability Scale, Usability Evaluation in Industry, 1st ed 1996. Book. (Abstract Only) https://www.taylorfrancis.com/chapters/edit/10.1201/9781498710411-35/sus-quick-dirty-usability-scale-john-brooke.

Dhakal et al., Observations on Typing from 136 Million Keystrokes, CHI '18: Proceedings of the 2018 CHI Conference on Human Factors in Computing Systems, Paper No. 646, 2018, 12 Pages. https://doi.org/10.1145/3173574.3174220.

Dolev et al., On the Security of Public Key Protocols, IEEE Transactions on Information Theory, vol. 29, Issue 2, 1983, 198-208. https://doi.org/10.1109/TIT.1983.1056650https://www.cs.huji.ac.il/~dolev/pubs/doley-yao-ieee-01056650.pdf.

Ghose et al., SFIRE: Secret-Free-In-Band Trust Establishment for COTS Wireless Devices, IEEE Infocom 2018—IEEE Conference on Computer Communications, 2018, 1529-1537. https://doi.org/10.1109/INFOCOM.2018.8486417.

Google, Google Nest: What Makes A Nest Thermostat a Nest Thermostat? Retrieved Mar. 2, 2023 from webpage: https://store.google.com/magazine/compare_thermostats?hl=en-US.

Han et al., Do You Feel What I Hear? Enabling Autonomous IoT Device Pairing Using Different Sensor Types, IEEE Symposium on Security and Privacy (SP), 2018, 836-852. https://doi.org/10.1109/SP.2018.00041.

Hinckley, Synchronous Gestures for Multiple Persons and Computers, UIST 2003 Symposium on User Interface Software & Technology, 2003, 10 Pages. https://doi.org/10.1145/964696.964713.

Honeywellhome, T9 Smart Thermostat, SKU: RCHT9510WFW2001/U, Retrieved Mar. 2, 2023 from webpage https://www.honeywellhome.com/us/en/products/air/thermostats/wifi-thermostats/t9-smart-thermostat-rcht9510wfw2001-u/.

Horowitz, WiFi Encryption. Retrieved Mar. 1, 2023 from webpage: https://routersecurity.org/wpa2wpa3wpaenterprise.php.

IEEE Standard Specification for Password-Based Public-Key Cryptographic Techniques, IEEE Standard 1363.2-2008, 2009, 1-140. https://doi.org/10.1109/IEEESTD.2009.4773330.

Jana et al., On the Effectiveness of Secret Key Extraction from Wireless Signal Strength in Real Environments, MobiCom '09: Proceedings of the 15th Annual International Conference on Mobile Computing and Networking, 2009 pp. 321-332. https://doi.org/10.1145/1614320.1614356.

Juels et al., A Fuzzy Commitment Scheme, CCS '99: Proceedings of the 6th ACM Conference on Computer and Communications Security, 1999, pp. 28-36. https://doi.org/10.1145/319709.319714.

Kim et al., Impact Activation Improves Rapid Button Pressing, CHI '18: Proceedings of the 2018 CHI Conference on Human Factors in Computing Systems, Paper No. 571, Apr. 2018, pp. 1-8. https://doi.org/10.1145/3173574.3174145.

Lewis, IBM Computer Usability Satisfaction Questionnaires: Psychometric Evaluation and Instructions for Use, International Journal of Human-Computer Interaction, vol. 7, Issue 1, 1995, 57-78. https://doi.org/10.1080/10447319509526110.

Li et al., Touch Well Before Use: Intuitive and Secure Authentication for IoT Devices, MobiCom '19: The 25th Annual International Conference on Mobile Computing and Networking, Article No. 33, 2019, pp. 1-17. https://doi.org/10.1145/3300061.3345434.

Lilliefors, On the Kolmogorov-Smirnov Test for Normality with Mean and Variance Unknown, Journal of the American Statistical Association, vol. 62, No. 318, 1967, 399-402. https://doi.org/10.2307/2283970.

Liu et al., Fast and Practical Secret Key Extraction by Exploiting Channel Response, 2013 Proceedings IEEE Infocom, 2013, 3048-3056. https://doi.org/10.1109/INFCOM.2013.6567117.

Mani et al., A System for Clock Synchronization in an Internet of Things, Computer Science, ArXiv, 2018, 18 Pages. https://arxiv.org/pdf/1806.02474.

Mare et al., ZEBRA: Zero-Effort Bilateral Recurring Authentication, 2014 IEEE Symposium on Security & Privacy, 2014, 16 Pages. https://doi.org/10.1109/SP.2014.51.

Mare et al., SAW: Wristband-Based Authentication for Desktop Computers, Proceedings of the ACM Interactive, Mobile, Wearable and Ubiquitous Technologies, vol. 2, No. 3, Article 125, 2018, 30 Pages. http://dx.doi.org/10.1145/3264935.

Mathur et al., Radio-Telepathy: Extracting a Secret Key from an Unauthenticated Wireless Channel, MobiCom '08: Proceedings of the 14th ACM International Conference on Mobile Computing and Networking, 2008 pp. 128-139. https://doi.org/10.1145/1409944.1409960https://winlab.rutgers.edu/~narayan/PAPERS/com0901-mathur.pdf.

Mayrhofer et al., Shake Well Before Use: Intuitive and Secure Pairing of Mobile Devices, IEEE Transactions on Mobile Computing, vol. 8, No. 6, 2009, 792-806. http://dx.doi.org/10.1109.TMC.2009.51.

McCune et al., Seeing-Is-Believing: Using Camera Phones for Human-Verifiable Authentication, 2005 IEEE Symposium on Security and Privacy (S&P'05), 2005, 110-124. https://apps.dtic.mil/sti/pdfs/ADA457868.pdf.

Miettinen et al., Context-Based Zero-Interaction Pairing and Key Evolution for Advanced Personal Devices, CCS '14: Proceedings of the 2014 ACM SIGSAC Conference on Computer and Communications Security, 2014, pp. 880-891. https://doi.org/10.1145/2660267.2660334.

Monrose et al., Authentication Via Keystroke Dynamics, Proceedings of the 4th ACM Conference On Computer and Communications Security, 1997, 48-56. https://dl.acm.org/doi/pdf/10.1145/266420.266434.

Motiv, Motiv Ring, Retrieved Mar. 2, 2023 from webpage: https://www.mymotiv.com/.

Norwich et al., Information, Sensation and Perception, Biopsychology.org, 1993, 8 Pages. https://biopsychology.org/norwich/isp/cc.pdf.

Patel et al., A Gesture-Based Authentication Scheme for Untrusted Public Terminals, UIST '04: Proceedings of the 17th annual ACM

(56) References Cited

OTHER PUBLICATIONS

Symposium on User Interface Software and Technology, vol. 6, Issue 2, 2004, pp. 157-160. https://doi.org/10.1145/1029632.1029658.

Patwari et al., High-Rate Uncorrelated Bit Extraction for Shared Secret Key Generation from Channel Measurements, IEEE Transactions on Mobile Computing, vol. 9, Issue 1, 2010, 17-30. https://doi.org/10.1109/TMC.2009.88.

Reed et al., Polynomial Codes Over Certain Finite Fields, Journal of The Society for Industrial and Applied Mathematics, vol. 8, No. 2, 1960, 300-305. https://faculty.math.illinois.edu/~duursma/CT/RS-1960.pdf.

Rostami et al., Heart-to-Heart (H2H): Authentication for Implanted Medical Devices, CCS '13: Proceedings of the 2013 ACM SIGSAC Conference on Computer & Communications Security, 2013, pp. 1099-1112. https://doi.org/10.1145/2508859.2516658.

Rukhin, et al., A Statistical Test Suite for Random and Pseudorandom Number Generators for Cryptographic National Institute of Standards and Technology, 2001, Special Publication 800-22, Revision 1a, 2001 Superseded by SP 800-22 Revision 1a, 2010. https://dl.acm.org/doi/pdf/10.5555/2206233.

Saxena et al., Secure Device Pairing Based on a Visual Channel, 2006 IEEE Symposium on Security and Privacy (S&P'06), 2006, 6 Pages, https://doi.org/10.11 09/SP.2006.35.

Schurmann et al., Secure Communication Based on Ambient Audio, IEEE Transactions on Mobile Computing, vol. 12, Issue 2, 2013, 14 Pages. https://doi.org/10.1109/TMC.2011.271.

Sethi et al., Commitment-Based Device Pairing with Synchronized Drawing, 2014 IEEE International Conference on Pervasive Computing and Communications (PerCom), 2014, 10 Pages. https://doi.org/10.1109/PerCom.2014.6813959.

Statista, Internet of Things (IoT) connected devices installed base worldwide from 2015 to 2025 (in billions), Technology & Telecommunications, Consumer Electronics, 2016. (Abstract Only) Retrieved Mar. 2, 2023 from webpage: https://www.statista.com/statistics/471264/iot-number-of-connected-devices-worldwide/.

Wang et al., Resonance-Based Secure Pairing for Wearables, IEEE Transactions on Mobile Computing, vol. 17, Issue 11, 2018, 2607-2618. https://doi.org/10.1109/TMC.2018.2809736.

Xi et al., Instant and Robust Authentication and Key Agreement Among Mobile Devices, CCS '16: Proceedings of the 2016 ACM SIGSAC Conference on Computer and Communications Security, 2016, 616-627. https://doi.org/10.1145/2976749.2978298.

Yan et al., Towards Touch-To-Access Device Authentication Using Induced Body Electric Potentials, The 25th Annual International Conference on Mobile Computing and Networking, 2019, 16 Pages. https://yanzhenvu.com/assets/pdf/TouchAuth-MobiCom19.pdf.

Zhang et al., Proximity Based IoT Device Authentication, IEEE Infocom 2017, IEEE Conference on Computer Communications, 2017, 9 Pages. https://doi.org/10.1109/INFOCOM.2017.8057145.

Zhang et al., Tap-to-Pair: Associating Wireless Devices with Synchronous Tapping, Proceedings of the ACM on Interactive, Mobile, Wearable and Ubiquitous Technologies, vol. 2, Issue 4, Article 201, 2018, 21 Pages. https://doi.org/10.1145/3287079.

* cited by examiner

Demonstration

User 1

User 2

User 3

Pairing via pressing a button

Pairing via twisting a knob

Pairing via swiping a touchscreen

| Device $d_1$ | Device $d_2$ |
|---|---|
| Phase 1: Initialization | |
| *Initiates the pairing* | |
| Phase 2: Extracting Evidence | |
| $E_{d_1} = Time\_Int\_Seq(d_1)$ | $E_{d_2} = Time\_Int\_Seq(d_2)$ |
| if self-checking fails, aborts | if self-checking fails, aborts and reminds the user |
| Phase 3: Fuzzy Commitment | |
| ① picks a random value $P \in \mathbb{F}_{2^k}^m$ | |
| ② $\lambda \in \mathbb{F}_{2^k}^n$, $\xrightarrow{encode}$ $RS(2^k, m, n, P)$ | |
| ③ commits: $\delta = e(E_{d_1}) \oplus \lambda$ | |
| $\xrightarrow{\delta}$ | |
| | ④ decommits: $\lambda' = e(E_{d_2}) \oplus \delta$ |
| | ⑤ $P'$ $\xleftarrow{decode}$ $RS(2^k, m, n, \lambda')$ |
| Phase 4: PAKE | |
| $\xrightarrow{E(w, A)}$ | |
| $\xleftarrow{E(w', B\|C_1)}$ | |
| $\xrightarrow{E(K, C_1\|C_2)}$ | |
| $\xleftarrow{E(K', C_2)}$ | |
| ⑥ picks $a$; $A = g^a \bmod p$; $w = h(P)$ | ⑦ picks $b$; $B = g^b \bmod p$; $w' = h(P')$ |
| ⑨ $K = B^a \bmod p$ | ⑧ $K' = A^b \bmod p$; picks a challenge $C_1$ |
| ⑩ picks a challenge $C_2$ | ⑪ if $C_1$ is not received, aborts |
| ⑫ if $C_2$ is not received, aborts | |

FIG. 4D (TABLE 1)

Button-based device pairing.

Knob-based device pairing.

Screen-based device pairing.

Button-based device pairing.

Knob-based device pairing.

Screen-based device pairing.

| Attacks | Pauses? | Device | A1 | A2 | A3 | A4 | A5 | A6 | A7 | A8 | A9 | A10 | Avg. |
|---|---|---|---|---|---|---|---|---|---|---|---|---|---|
| MA-obstructed No clear view Untrained attackers | No | Button | 0.07 | 0.0 | 0.13 | 0.0 | 0.07 | 0.07 | 0.0 | 0.07 | 0.0 | 0.0 | 0.040 |
| | | Knob | 0.07 | 0.07 | 0.0 | 0.07 | 0.0 | 0.13 | 0.0 | 0.07 | 0.07 | 0.0 | 0.047 |
| | | Screen | 0.07 | 0.13 | 0.13 | 0.07 | 0.13 | 0.07 | 0.07 | 0.13 | 0.07 | 0.07 | 0.093 |
| | Yes | Button | 0.0 | 0.0 | 0.07 | 0.0 | 0.0 | 0.0 | 0.0 | 0.0 | 0.0 | 0.0 | 0.007 |
| | | Knob | 0.0 | 0.0 | 0.0 | 0.0 | 0.0 | 0.0 | 0.0 | 0.0 | 0.0 | 0.0 | 0.000 |
| | | Screen | 0.0 | 0.0 | 0.0 | 0.0 | 0.0 | 0.0 | 0.0 | 0.0 | 0.07 | 0.0 | 0.007 |
| MA-clear Clear view Untrained attackers | No | Button | 0.07 | 0.13 | 0.20 | 0.0 | 0.07 | 0.07 | 0.07 | 0.07 | 0.13 | 0.13 | 0.093 |
| | | Knob | 0.13 | 0.07 | 0.13 | 0.13 | 0.07 | 0.20 | 0.0 | 0.07 | 0.13 | 0.07 | 0.100 |
| | | Screen | 0.07 | 0.13 | 0.33 | 0.27 | 0.20 | 0.33 | 0.07 | 0.13 | 0.20 | 0.07 | 0.180 |
| | Yes | Button | 0.0 | 0.0 | 0.07 | 0.0 | 0.0 | 0.07 | 0.0 | 0.0 | 0.07 | 0.0 | 0.020 |
| | | Knob | 0.07 | 0.0 | 0.07 | 0.0 | 0.0 | 0.13 | 0.07 | 0.0 | 0.0 | 0.07 | 0.040 |
| | | Screen | 0.0 | 0.07 | 0.0 | 0.07 | 0.07 | 0.20 | 0.0 | 0.0 | 0.0 | 0.0 | 0.020 |
| MA-trained Clear view Trained attackers | No | Button | 0.20 | 0.27 | 0.27 | 0.40 | 0.20 | 0.20 | 0.33 | 0.27 | 0.33 | 0.27 | 0.274 |
| | | Knob | 0.27 | 0.20 | 0.27 | 0.33 | 0.20 | 0.13 | 0.27 | 0.20 | 0.40 | 0.13 | 0.240 |
| | | Screen | 0.20 | 0.07 | 0.13 | 0.27 | 0.33 | 0.20 | 0.13 | 0.20 | 0.20 | 0.07 | 0.180 |
| | Yes | Button | 0.0 | 0.07 | 0.07 | 0.07 | 0.07 | 0.07 | 0.07 | 0.0 | 0.07 | 0.0 | 0.040 |
| | | Knob | 0.0 | 0.0 | 0.0 | 0.07 | 0.0 | 0.07 | 0.07 | 0.0 | 0.13 | 0.0 | 0.040 |
| | | Screen | 0.0 | 0.0 | 0.0 | 0.0 | 0.07 | 0.07 | 0.0 | 0.0 | 0.13 | 0.0 | 0.027 |

FIG. 7D (TABLE 2)

| Test | p-value | | |
|---|---|---|---|
| | Button | Knob | Screen |
| Frequency | 0.327 | 0.581 | 0.300 |
| Block Frequency | 0.854 | 0.118 | 0.807 |
| Runs | 0.190 | 0.697 | 0.046 |
| Longest Run | 0.249 | 0.624 | 0.164 |
| Approximate Entropy | 0.051 | 0.369 | 0.095 |
| FFT | 0.567 | 0.567 | 0.829 |
| Cumulative Sums (Fwd) | 0.537 | 0.318 | 0.505 |
| Cumulative Sums (Rev) | 0.476 | 0.681 | 0.343 |
| Serial | 0.387 | 0.251 | 0.360 |
| | 0.601 | 0.074 | 0.796 |

FIG. 7E (TABLE 3)

| | Button | Knob | Screen |
|---|---|---|---|
| $\sigma$ of $I_1$ (ms) | 67 | 72 | 53 |
| $\sigma$ of $I_2$ (ms) | 501 | 362 | 424 |
| Entropy (bits) | 34.3–38.5 | 34.3–37.9 | 32.3–36.6 |
| Bit Rate (bit/sec) | 10.3–13.2 | 10.6–13.6 | 11.6–14.8 |

FIG. 7F (TABLE 4)

Intervals of $I_1$.

Intervals of $I_2$.

FAR vs. evidence length

EER vs. base value

EER vs. sampling rate

| Method | (FAR, FRR) | Time(s) |
|---|---|---|
| ShaVe/ShaCK [30] | (0.0, 0.10–0.12) | 3 |
| SFIRE [12] | (0.0, -) | 6 |
| Tap-to-Pair [49] | (-, 0.117) | 15–20 |
| Checksum [1] | (-, 0.10) | 5.7 |
| T2PAIR | (0.0, 0.03–0.09) | 3.2–4.1 |

FIG. 9G (TABLE 5)

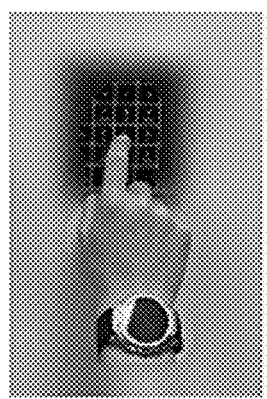
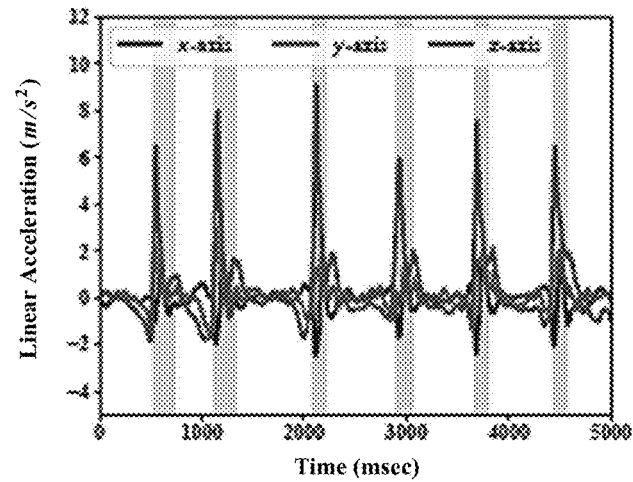
FIG. 11A  FIG. 11B
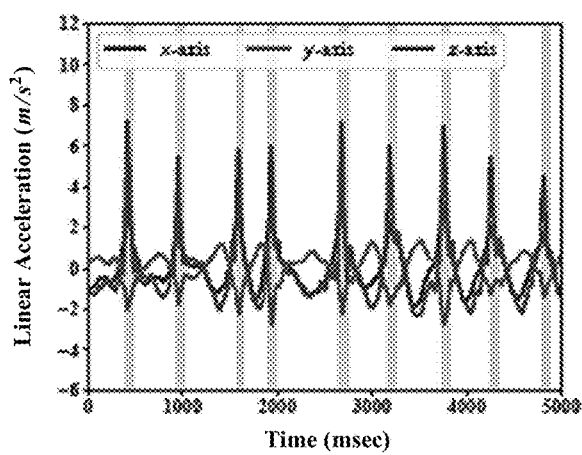
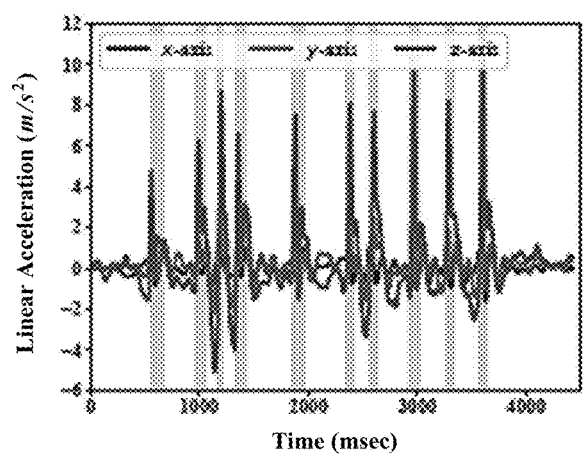
FIG. 11C  FIG. 11D

Demonstration

User 1

User 2

User 3

Demonstration

User 1

User 2

User 3

PASSWORD-FREE USABLE AND SECURE PAIRING OF IoT DEVICES

CROSS REFERENCE TO RELATED APPLICATION

This application claims filing benefit of U.S. Provisional Patent Application Ser. No. 63/188,066, having a filing date of May 13, 2021, entitled "Highly Usable and Secure Pairing of IoT Devices" and claims filing benefit of U.S. Provisional Patent Application Ser. No. 63/251,317, having a filing date of Oct. 1, 2021, entitled "Highly Usable and Secure Pairing of IoT Devices", both of which are fully incorporated herein by reference and for all purposes.

STATEMENT REGARDING FEDERALLY SPONSORED RESEARCH OR DEVELOPMENT

This invention was made with Government support under Grant No. CNS1856380, awarded by the National Science Foundation. The Government has certain rights in this invention.

BACKGROUND

Secure pairing is key to trustworthy deployment and application of Internet of Things (IoT) devices. For example, after you purchase a new IoT device, you need to pair it into your home network by telling it the home Wi-Fi® password. However, IoT devices lack conventional user interfaces, such as keyboards and displays, which make many traditional pairing approaches inapplicable.

The current pairing method on market works as follows: The user's mobile phone (or other device) connects to the IoT device's network, and the user types the device password (note, this is not your home WiFi® password) on the phone to establish a secure connection; then, the mobile phone transmits the home WiFi® password to the device. It has the following limitations: (1) This method is insecure if a vendor uses the same password for all its devices; on the other hand, if a unique password is used, the vendor has to carefully make sure the password is correctly printed on each user manual, which is a burden to the vendor; (2) given an IoT device (such as a smart blood meter in Walmart®) that needs to get paired with many users' personal mobile devices, a single password for all users is insecure; and (3) it is not user friendly in that it requires a user to type the device password on his phone.

After you purchase a new IoT device, it can be difficult to connect it to your home Wi-Fi® or pair it with your smartphone. Very often, the process can be hacked by your neighbor or a remote attacker, as the new device may get paired with the attacker or you may leak your home WiFi® password to the attacker.

Proximity-based pairing approaches are very usable but can be exploited by collocated malicious devices. Approaches based on a user's physical operations on IoT devices are more secure, but typically require inertial sensors, while many devices do not satisfy this requirement.

To pair a desktop or smartphone to an existing network, the user simply inputs the network password to the device. However, most IoT devices do not have user interfaces (UIs) for inputting passwords, and thus, cannot apply this approach.

Many IoT device vendors have the user use her personal mobile device (e.g., a smartphone) to connect the IoT device's hotspot and input the home Wi-Fi® password. If the network connection is secure (how to ensure it is a challenge [4,12]), the IoT device can obtain the password from the mobile device securely. This way, the problem of pairing an IoT device is reduced to mutual authentication between the IoT device and user's mobile device.[48] We also leverage a user's mobile device for pairing IoT devices.

The literature has proposed many IoT pairing approaches, which can be divided into at least two categories. The first category establishes pairing on proximity between devices to be paired. [4,12,14,32,42,48,49] It can be further divided into two sub-categories: (a) As all IoT devices have certain wireless communication capabilities, some approaches (such as Move2Auth [48]) prove proximity by exploiting characteristics of wireless signals [12,48,49] and (b) Other approaches (such as Perceptio [14]) make use of the ambient context, like audio and light, to prove proximity. [4,32,42] Approaches in this category usually feature usability; however, they can be exploited by co-located malicious devices.

Approaches in the second category require the user to physically contact or operate the IoT device. [15,30,45] For example, ShaVe/ShaCK [30] has a user hold her smartphone and the IoT device together in one hand and shake them, and then the knowledge of the shared movement sequence is used for pairing. They are generally more secure as physical operations are involved in the pairing process. But they require IoT devices to have inertial (or touch) sensors that sense the user's operations, while many IoT devices do not have such sensors.

A secure and usable pairing approach that can be applied to heterogeneous IoT devices still does not exist.

SUMMARY

A secure and usable (password-free) pairing approach that can be applied to heterogeneous IoT devices is highly desired. We propose a new pairing method that does not need the user to input the device password (i.e., password-free). Alternatively, the user first puts his phone (or smartwatch) close to the IoT device, and then the phone automatically connects the IoT device's network. Here, we assume the phone will choose the strongest signal to connect, so it may be manipulated by an attacker at this step. An alternative way is to have the user manually select which network to connect on the phone's network setting page, just like selecting a Wi-Fi®.

The user holding the smartphone (or wearing a wristband) can then finish pairing in seconds through some very simple operations, e.g., pressing a button or twisting a knob. The inertial sensor (IMU sensor) of the phone/smartwatch can sense the time when the button is pressed or when the twisting changes its direction, and the IoT side can obviously sense the same or very similar time. Based on the shared knowledge of the timestamps, the two sides can use a cryptographic protocol to establish a secure channel, over which the home WiFi® password can be transmitted from the user phone to the IoT device. There can be various cryptographic protocol designs, such as fuzzy commitment, but it can use the H2H protocol or any other protocols that allow secure mutual authentication.

With this innovation, a user holding a smartphone or wearing a smartwatch can finish secure pairing by pressing the IoT device's button, twisting its knob, or swipe its touchscreen a few times.

Secure pairing is key to trustworthy deployment and application of IoT devices. This innovation provides a highly usable and secure pairing method.

All IoT devices on the market have to support pairing. Thus, the innovation can have an impact on billions of IoT devices. The global market for IoT, which was valued at $761.4 billion in 2020, will surpass $1.38 trillion ($1,386.06 billion) by 2026. The total installed base of IoT-connected devices worldwide is projected to amount to 30.9 billion units by 2025, a sharp jump from the 13.8 billion units that are expected in 2021. This innovation can improve the usability and security for almost all the IoT device pairings.

As described above, the innovation can significantly improve the usability and security of IoT pairing. Several companies have their own pairing methods, which usually work as follows:

(1) The user connects her smartphone to the IoT device's WiFi® or Bluetooth® network.
(2) The user types the device password, but how to generate and store the password is an issue. Some companies omit this step (e.g., the user only needs to turn the light off and on), and thus, the pairing is very insecure.
(3) The smartphone then pairs with the IoT device, e.g., by telling the Wi-Fi® password to the IoT device.

Our innovation can get rid of the device password completely (hence, high usability for both the vendor and the user) and ensure the security of the device.

Presently disclosed Touch-to-Pair (T2Pair, for short) technology provides secure and usable pairing for heterogeneous IoT devices. We develop a technique, Universal Operation Sensing, which allows an IoT device to sense the user's physical operations on it without requiring inertial sensors. With this technique, a user holding a smartphone or wearing a wristband can finish pairing in seconds through some very simple operations, e.g., pressing a button or twisting a knob. Moreover, we reveal an inaccuracy issue in original fuzzy commitment and propose faithful fuzzy commitment to resolve it. We design a pairing protocol using faithful fuzzy commitment and build a prototype system named Touch-to-Pair (T2Pair, for short). The comprehensive evaluation shows that it is secure and usable.

It is to be understood that the presently disclosed subject matter equally relates to associated and/or corresponding methodologies. One exemplary such method relates to methodology for secure pairing of an IoT device with a mobile device having an inertial sensor, without requiring a user to input a password, comprising placing the mobile device and IoT device close together; connecting the mobile device to a Wi-Fi® network to be associated with the IoT device; conducting mutual authentication; performing a finish pairing physical operation on the IoT device in conjunction with the mobile device; sensing at least one of an axial acceleration or angular velocity at the mobile device to generate a mobile device timestamp of the physical operation while creating an IoT device timestamp of the physical operation on the IoT device; and using shared timestamp data from the IoT device and the mobile device to establish a secure channel over which the home WiFi® password can be transmitted from the mobile phone to the IoT device.

Another exemplary such method in accordance with presently disclosed subject matter relates to a method for secure and usable pairing for heterogeneous IoT devices comprising conducting a universal operation sensing step with the mobile device having an inertial sensor, to sense a user's physical operations on an associated IoT device without requiring the IoT device to have an inertial sensor; creating event evidence at the IoT device and at the mobile device of a physical operation on the IoT device; and comparing the event evidence to establish mutual authentication for the IoT device and the mobile device, and complete pairing of the IoT device with the mobile device.

Other example aspects of the present disclosure are directed to systems, apparatus, tangible, non-transitory computer-readable media, user interfaces, memory devices, and electronic devices for ultrafast photovoltaic spectroscopy. To implement methodology and technology herewith, one or more processors may be provided, programmed to perform the steps and functions as called for by the presently disclosed subject matter, as will be understood by those of ordinary skill in the art.

Another exemplary embodiment of presently disclosed subject matter relates to an IoT smart device for pairing with a second smart device, comprising an IoT smart device having one or more processors programmed for: (1) creating an IoT smart device sequence of timestamp data in response to physical operations of a user on the IoT smart device while the user holds a second smart device having an inertial sensor; (2) communicating with the second smart device to receive therefrom a second smart device sequence of timestamp data in response to the physical operations of a user on the IoT device; (3) comparing the IoT smart device sequence of timestamp data with the second smart device sequence of timestamp data to ensure correlation of the two sequences within a threshold; and (4) pairing the IoT smart device with the second smart device once the threshold is met.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the Figures or stated in the detailed description of such Figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

These and other features, aspects and advantages of various embodiments will become better understood with reference to the following description and appended claims. The accompanying figures, which are incorporated in and constitute a part of this specification, illustrate embodiments of the present disclosure and, together with the description, serve to explain the related principles.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which:

FIG. 4D (Table 1) shows a representative table of a presently disclosed pairing protocol having four respective phases, including (1) Initialization, (2) Extracting Evidence, (3) Fuzzy Commitment, and (4) Password-Authenticated Key Agreement (PAKE);

FIG. 7D (Table 2) shows a table of data results for False Acceptance Rates (FARs) under mimicry attacks (where Ai stands for the ith attacker);

FIG. 7E (Table 3) shows a table of NIST statistical test data results (where a p-value greater than 0.01 indicates a randomness test is passed);

FIG. 7F (Table 4) shows a table of average entropy and estimated bit rate data, respectively, for button, knob, and screen scenarios;

FIG. 9B illustrating EER vs. base value; FIG. 9C illustrating EER vs. sampling rate; FIG. 9D illustrating EER vs. device position; FIG. 9E illustrating EER vs. helper, and FIG. 9F illustrating EER vs. IoT;

FIG. 9G (Table 5) shows a table of data comparing results of the presently disclosed T2Pair subject matter with some prior works;

FIG. 11A-FIG. 11H illustrate representative gyroscope data captured when three different users press buttons, and their correlation with button-pressing operations, with the user wearing a smartwatch (FIG. 11A-FIG. 11D) or holding a smartphone (FIG. 11E-FIG. 11H)

Figure 1:
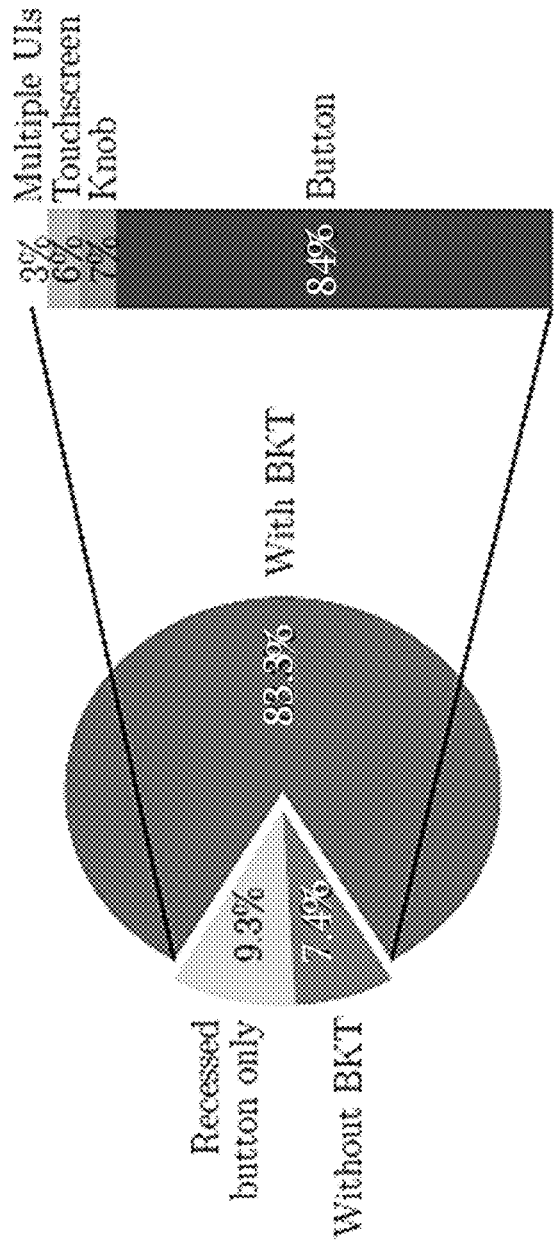
FIG. 1 is a graphical representation showing the distribution of physical UIs on 270 popular IoT devices.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In general, the present disclosure is directed to IoT devices, which are widely deployed and generate great impacts on various industries and our daily lives. A study estimates that the number of installed IoT devices will reach 75 billion by 2025. [44] As pairing is to establish a communication channel, a convenient and secure pairing approach is critical to wide deployment and trustworthy application of IoT devices.

We considered IoT devices that (1) do not have sophisticated UIs like keyboards; (2) may be located close to untrusted or malicious devices (for example, a hospital may contain a mix of devices that belong to the doctors, patients, or attackers); (3) do not necessarily have inertial sensors; and (4) may be mobile or mounted, installed indoors or outdoors. A secure and usable pairing approach that is applicable to such heterogeneous IoT devices still does not exist. For example, Perceptio [14] can only be applied to IoT devices installed indoors without co-located malicious devices. We propose a system named T2Pair that is not only secure but applicable to heterogeneous IoT devices. Moreover, it is very easy to use—a user wearing a wristband (or holding a smartphone) only needs to touch, in the form of some very simple operations, the IoT device for a few seconds to finish pairing.

T2Pair is built on a technique, Universal Operation Sensing (UOS), which allows an IoT device to sense user operations on an IoT device without requiring any inertial sensors. When a user wearing a wristband or holding a smartphone touches an IoT device, such as pressing its button a few times, twisting its knob back and forth, or swiping its touchscreen[1] in a zigzag way, salient points arise when the button is pressed/released or the twisting/swiping changes its direction. ([1]Touchscreens allow users to input passwords directly; however, the usability of inputting a Wi-Fi® password of eight characters or longer on a small touchscreen is poor. We thus extended T2Pair to touchscreens.) We shared an insight with P2Auth [23] and Perceptio [14] that every IoT device has a clock. To make the technique widely applicable, we used timestamps to describe salient points. On the user's wristband (or smartphone) side, the same set of salient points can be identified by analyzing the motion data captured by the built-in Inertial Measurement Unit (IMU). Subsequently, the wristband and the IoT device can make use of the knowledge of the salient points to authenticate each other.

T2Pair can be widely applied to most IoT devices on the market. FIG. 1 is a graphical representation of the distribution of physical UIs on 270 popular IoT devices. "With BKT" means the device has a normal button, knob or touchscreen, while "recessed button" refers to a small hole that can be pressed using, e.g., a ball-point pen. As shown in FIG. 1, our survey of 270 most popular IoT devices on Amazon® (ranked by the number of reviews) indicates that 92.6% of them have a normal button, knob, touchscreen, or recessed button. For example, an Amazon® smart plug, which does not need much interaction, has a button for pairing and turning it on/off.

We assumed the adversary has full control over all communication channels. Thus, given that the wristband and the IoT device do not have prior security association, how to perform secure authentication in the presence of attacks, such as man-in-the-middle (MITM) attacks, is a challenge. This is a critical difference between IoT pairing and authentication [23], as the latter usually assumes the IoT device is already securely associated with the user's token or device used for authentication. Another challenge is that the user's wristband and the IoT device may have small differences with regard to the observations of salient points. To overcome the two challenges, we first tried fuzzy commitment [20], which incorporates cryptography and error-correcting code, such that the two sides (wristband and IoT device) can securely authenticate each other without leaking the knowledge to the MITM adversary while tolerating the aforementioned small differences.

However, this attempt failed. Our experiment showed that the original fuzzy commitment leads to a high pairing-failure rate and reveals that sometimes small differences between observations lead to very different encodings, while large differences result in similar encodings. We thus proposed faithful fuzzy commitment, which makes sure distances between encodings faithfully reflect differences between observations.

Furthermore, we uncovered a security weakness under trained mimicry attacks (i.e., an attacker who is familiar with the victim user mimics her pairing operations) and showed how to enhance T2Pair without harming usability. A prominent advantage of T2Pair is that it does not need clock synchronization, as it uses intervals between salient points for encoding, which makes the pairing resilient to attacks that interfere with clock synchronization.

We implemented T2Pair and evaluated it on prototypical IoT devices with buttons, knobs, or touchscreens. The evaluation results showed that T2Pair has very low false rejection/acceptance rates, and the pairing took only 7 seconds. A user study was performed, confirming high usability of T2Pair. We made the following contributions:

We developed UOS, which allows IoT devices to sense user operations and uses timestamps to describe them, without requiring inertial sensors. We revealed the weakness of pairing based on UOS under trained mimicry attacks and enhanced it to attain both usability and security.

We proposed faithful fuzzy commitment, such that small distances between encodings faithfully reflect small differences between values being encoded and vice versa. A pairing protocol based on faithful fuzzy commitment and password-authenticated key exchange [5] was proposed, with strong resilience to attacks.

Built on the two techniques, we proposed and implemented T2Pair. A user only needs to touch the IoT device, in the form of pressing a button, twisting a knob, or swiping a touchscreen, to finish pairing. The pairing method can be applied to heterogeneous IoT devices without requiring inertial sensors and largely eliminates the threat of co-located malicious devices. The comprehensive evaluation showed that T2Pair is secure and usable.

The rest of the disclosure is organized as follows: Section 2 describes the system overview and threat model; Section 3 presents UOS; Section 4 the protocol; Section 5 implementation details; Section 6 describes the dataset collection; Section 7 the evaluation; Section 8 discusses related work; Section 9 the limitations; and the disclosure is concluded in Section 10.

Section 2: System Overview and Threat Model

Given an IoT device, our goal is that a user can utilize her personal mobile device—called a helper—such as a smartphone, fitness tracker, smartwatch, or smart ring [34], to securely pair an IoT device by quickly performing simple operations on the device.

Figure 2:
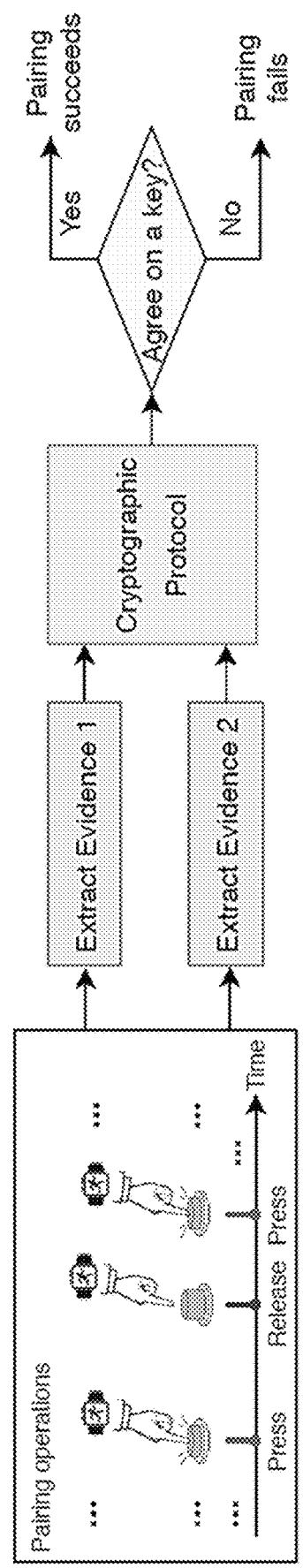
FIG. 2 is a graphical/flow chart representation of an exemplary embodiment representing architecture of T2Pair presently disclosed subject matter, using a wristband as the helper and an IoT device with a button as an example.

We took the device with a single button, as an example, to illustrate the overview of our pairing mechanism. FIG. 2 is a graphical/flow chart representation of an exemplary embodiment representing architecture of T2Pair presently disclosed subject matter using a wristband as the helper and an IoT device with a button as an example. Stated another way, FIG. 2 shows a block diagram of presently disclosed T2Pair subject matter, where a user wearing a helper presses the button a few times to conduct the pairing. In the process, the device makes use of its clock to describe the button-pressing events and derives a piece of evidence of the pairing operations, while the helper collects readings from its accelerometer/gyroscope and independently generates another piece of evidence. We further designed a protocol that allows the two parties to compare the evidence without leaking it to the MITM attacker. If the difference is small enough, they will be able to agree on a session key.

Threat Model. The attacker $\mathcal{A}$ has one or multiple of the following goals: (G1) The victim $\mathcal{V}$'s helper Hv pairs $\mathcal{A}$'s malicious device $D_a$, so $H_v$ is fooled to exchange data (such as the Wi-Fi® password, photos, sensor data) with $D_a$; (G2) The IoT device $D_v$ pairs a malicious helper $H_a$ of $\mathcal{A}$, so $D_v$ is fooled to exchange data with $H_a$; and (G3) $\mathcal{A}$ cracks the symmetric key and uses it to eavesdrop and/or manipulate the communication between $H_v$ and $D_v$.

We assumed $\mathcal{A}$ had full knowledge of our pairing protocol. As in previous studies, our work followed a standard Dolev-Yao adversary model [11, 14, 32]; i.e., the adversary has full control over all communication channels. Based on this, $\mathcal{A}$ may launch MITM attacks, e.g., by intercepting $D_v$'s ($H_v$'s, resp.) message sent to $H_v$ ($D_v$, resp.) and sending faked messages instead. We further considered the attacks below.

Mimicry Attacks. If $\mathcal{A}$ has a visual observation of $\mathcal{V}$, $\mathcal{A}$ may launch a mimicry attack by mimicking $\mathcal{V}$'s pairing operations in order to achieve G1 and/or G2. We examined the following threat scenarios where $\mathcal{A}$ had increasing capabilities: (1) MA-obstructed: $\mathcal{A}$ could see $\mathcal{V}$ but could not directly see $\mathcal{V}$'s hand motions due to certain obstructions; (2) MA-clear: $\mathcal{A}$ could clearly see $\mathcal{V}$'s hand motions by selecting an optimal viewing angle; and (3) MA-trained: $\mathcal{A}$ was familiar with $\mathcal{V}$ and trained by learning the pairing operations of $\mathcal{V}$ before launching a mimicry attack described in MA-clear.

Brute-Force Attacks. (1) BF-online: During the pairing process, $\mathcal{A}$ tried every possible piece of evidence until it hit a correct one, so $H_\nu$ and/or $D_\nu$ were fooled to pair the attacker. (2) BF-offline: $\mathcal{A}$ may collect all the pairing traffic and perform offline analysis in order to crack the established key after pairing.

Attacks Beyond Scope. $\mathcal{A}$ may be equipped with a camera and computer-vision techniques to analyze $\mathcal{V}$'s hand movements. Like other pairing approaches that require physical operations, such as ShaVe/ShaCK [30], T2Pair is also vulnerable to such attacks. At a user's home or office, however, the attack is not easy to launch as it requires an attacker-controlled camera that points at the user.

$\mathcal{A}$ may launch Denial-of-Service (DoS) attacks to manipulate the communication channel and disrupt the pairing. But if failed pairings occur repetitively, the helper can alert the user, who can take actions to investigate or report the attacks.

Section 3: Pairing Operations and Evidence

We introduced pairing operations in Section 3.1, studied operation sensing in Section 3.2, and presented evidence extraction in Section 3.3.

3.1 Pairing Operations

To devise usable and effective pairing operations, the UI properties of IoT devices should be taken into consideration. According to our survey, the most common UIs of resource constrained IoT devices include buttons (e.g., AWS IoT Button [21]), knobs (e.g., Nest Thermostats [13]), and touchscreens (usually small, e.g., Honeywell T9 Smart Thermostats [16]). Thus, our design of UOS considers the three types of UIs: buttons, knobs, and touchscreens, and includes the following pairing operations.

Pressing the button a few times with one or more random pauses added. A "pause" here means that after the button is pressed down, the user holds, intentionally, for a random short time before releasing it. Note that it does not refer to the natural pause when a user presses down a button and naturally holds shortly before releasing it. Our experiments revealed that UOS without pauses is weak under trained mimicry attacks (Section 7.2), while UOS with pauses is much more resilient (Section 7.2).

Twisting the knob back and forth with one or more random pauses added. When the knob is twisted, the microcontroller on the IoT device can detect the direction and amount of current twisting. To add a pause, the user intentionally holds for a random short time right prior to changing the twisting direction.

Zigzag swiping on the touchscreen with one or more random pauses added. Rather than asking the user to draw a specific shape or pattern on a small screen, which harms usability, the user simply swipes the screen using a finger from left to right and back again for a few times. Similarly, for better security, the user can hold for a short time right before changing the swiping direction.

All the operations are simple and easy to perform. More importantly, each involves "crispy" speed/direction changes, which can be sensed by both IoT device and the helper (Section 3.2). Similar operations, without pauses, were used in our prior work P2Auth for authentication [23], but it was unclear how they could be used for pairing and whether they were resilient to trained mimicry attacks.

3.2 Study of Sensing Pairing Operations

It is reliable (and trivial) to use the controller or sensor of an IoT device to sense the button-down/button-up, knob twisting, or screen swiping. We collected the data readings from the IoT device, along with the corresponding time, and regarded them as ground truth.

On the side of the helper, it used the embedded IMU to collect motion data during pairing operations. It is thus critical to explore the following questions: (1) Does the IMU data show certain correlations with the ground truth? and (2) Are the correlations reliable across different devices, users, and pairing instances?

To this end, we asked users to perform each of the three types of pairing operations (no pauses for simplicity of discussion). The user can decide the posture of her hand and wrist and can use different helpers (a smartwatch or smartphone).

Figure 3A:
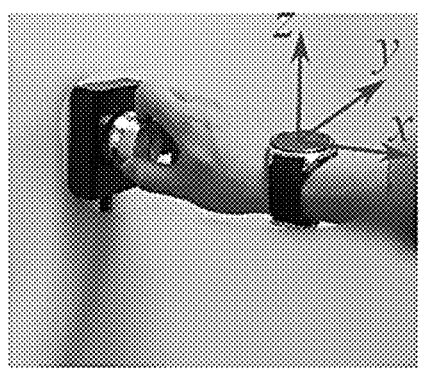
FIG. 3A-FIG. 3H illustrate representative gyroscope data captured when three different users twist knobs, with the user either wearing a smartwatch (FIG. 3A-FIG. 3D), or holding a smartphone (FIG. 3E-FIG. 3H)
Figure 3B:
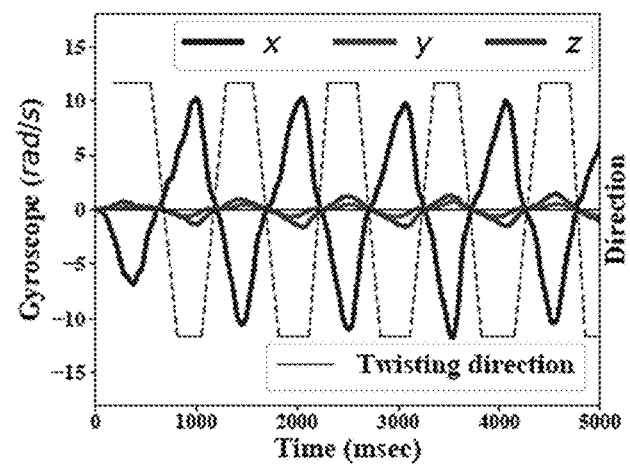
Figure 3C:
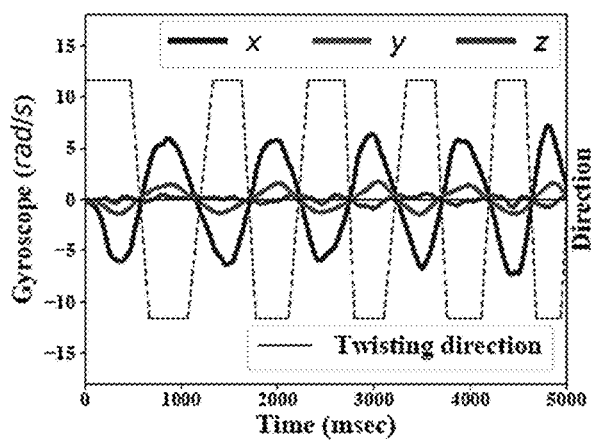
Figure 3D:
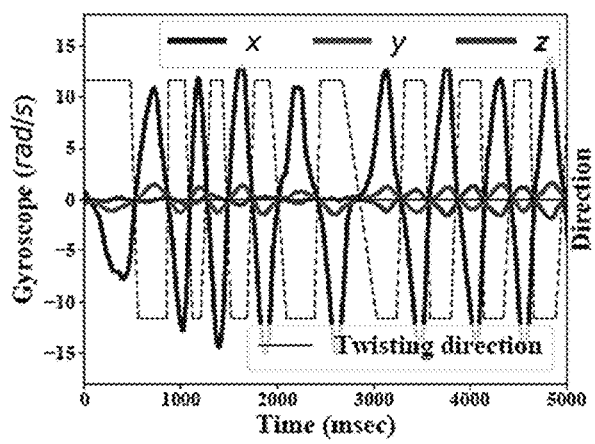
Figure 3E:
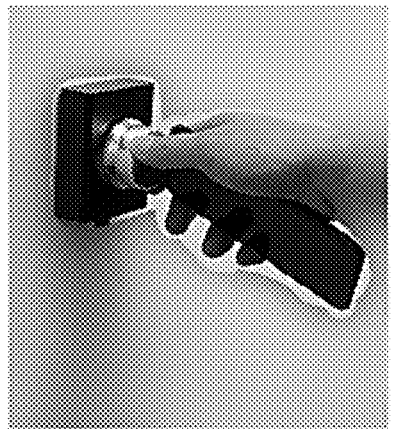

FIG. 3A-FIG. 3H illustrate representative gyroscope data captured when three different users twist knobs, with the user wearing a smartwatch (FIG. 3A-FIG. 3D) or holding a smartphone (FIG. 3E-FIG. 3H). The lines in the graphs show the ground truth of the twisting direction. For example, the photo of FIG. 3A shows a user wearing a smartwatch, while FIG. 3E is a photo showing a user holding a smartphone.

We used knob twisting as an example, as shown in FIG. 3A-FIG. 3H. We observed a strong correlation between the twisting operations and the gyroscope data (as shown by the graphs), which measures the angular velocity of its rotation. In other words, regardless of the user and her posture of hand and wrist, the gyroscope data changes from positive (resp. negative) values to negative (resp. positive) values, as the rotation direction changes according to the ground truth. On the other hand, the acceleration did not show such a strong correlation, as twisting affects the angular velocity significantly rather than the linear speed.

Figure 3F:
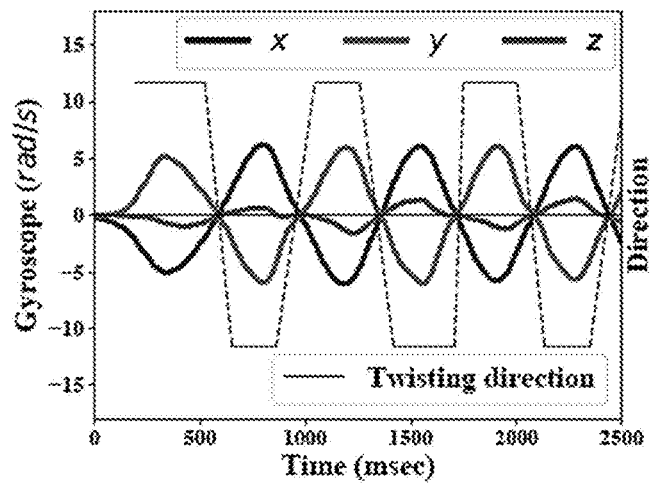
Figure 3G:
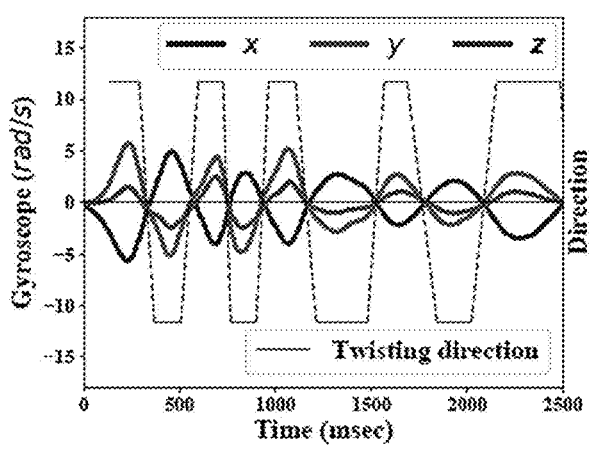
Figure 3H:
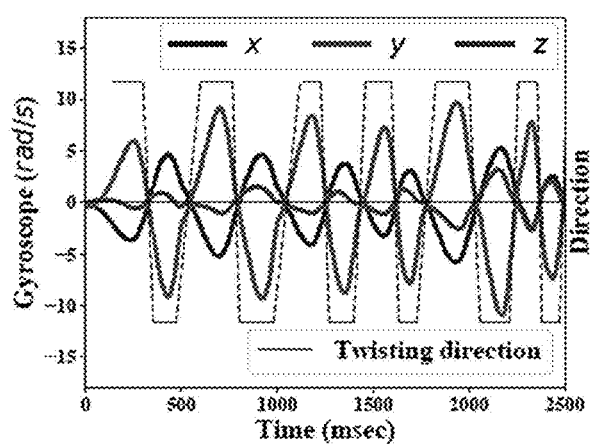

This strong correlation can be observed in at least one axis of the gyroscope data. For example, when the knob is rotated roughly around the x-axis of the smartwatch (FIGS. 3B-3D), the gyroscope signal along the x-axis changes significantly as the rotation direction changes. In FIGS. 3F-3H, there exist significant signal changes in both the x-axis and y-axis of the gyroscope data. We thus concluded that the gyroscope and knob twisting have a strong correlation in at least one axis of the gyroscope data, which features significant value changes. The detection of the axis of data that showed the most significant value changes is straightforward, and it is determined to be the dominant axis.

Strong correlations were observed for the other two types of pairing operations (see FIGS. 11 and 12). For each button pressing, the acceleration data along at least one axis had a sharp peak or valley. The gyroscope data did not have significant changes—when the user's finger pressed a button, the acceleration reached a peak quickly because the finger's moving speed suddenly decreased to zero while the gyroscope data was not affected much. Like twisting knobs, in the case of zigzag swiping, the gyroscope data changes significantly as the swiping direction changes.

3.3 Extracting Evidence

Figure 4A:
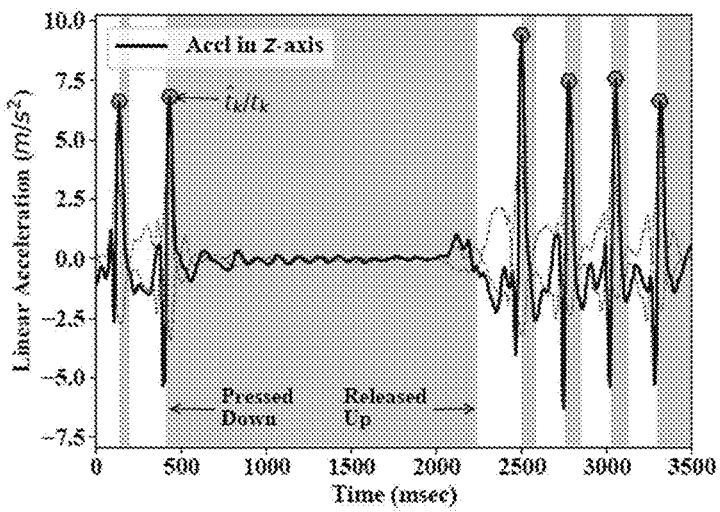
FIGS. 4A, 4B, and 4C illustrate graphical representations for determining in accordance with presently disclosed subject matter, the salient points for three types of pairing operations, including pairing via pressing a button (FIG. 4A), pairing via twisting a knob (FIG. 4B), and pairing via swiping a touchscreen (FIG. 4C)
Figure 4B:
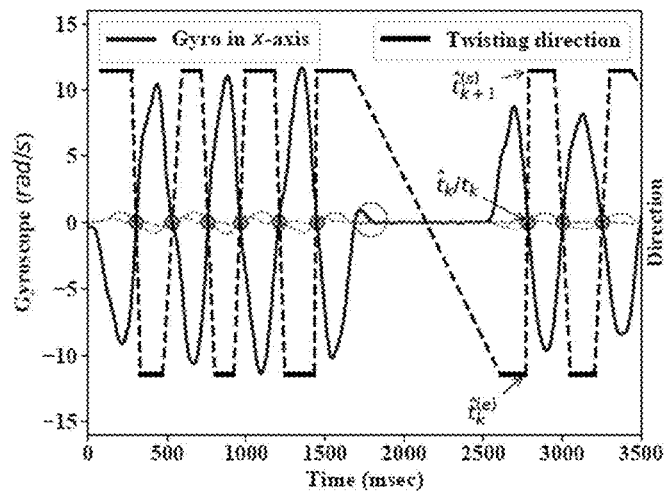
Figure 4C:
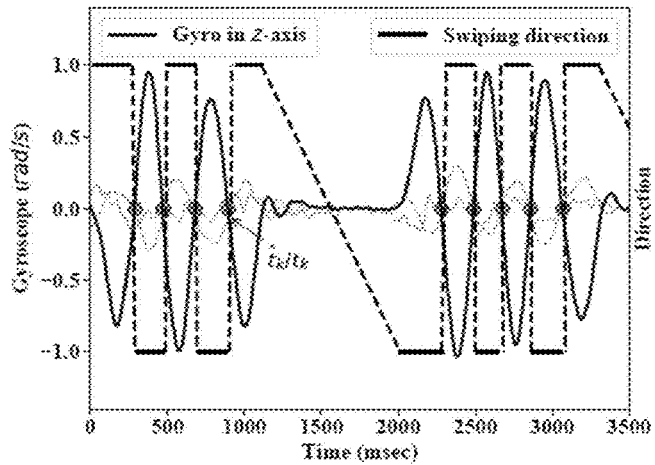

The strong correlations provided basis for comparison, but it was not easy to directly compare the two sequences of heterogeneous data: the IoT device receives a sequence of input events, while the helper's IMU generates a sequence of motion data. To address it, we proposed to extract salient points from the data and used the occurrence time of each point to represent it making it easier to compare. Below, we used $d_1$ to denote the IoT device and $d_2$ the helper. FIGS. 4A, 4B, and 4C illustrate graphical representations for determining, in accordance with presently disclosed subject matter, the salient points for three types of pairing operations, including pairing via pressing a button (FIG. 4A), pairing via twisting a knob (FIG. 4B), and pairing via swiping a touchscreen (FIG. 4C).

3.3.1 Salient Points on the IoT Device Side.

(1) Pressing buttons. Pressing a button once generates two events: PressedDown and ReleasedUp, as shown in FIG. 4A (the gray area shows the duration between two consecutive PressedDown and ReleasedUp events). We adopted the PressedDown events during pairing as the salient points, as they can be sensed on both sides (see Section 3.2). We thus obtained the timestamp sequence $$S_{d_1} = \{\hat{t}_1, \hat{t}_2, \ldots, \hat{t}_n\}$$

where $\hat{t}_k$ is the occurrence time of the kth PressedDown. It is worth noting that a random pause just introduces a relatively longer time span between two consecutive salient points. Thus, we did not explicitly identify and represent pauses.

(2) Twisting knobs. Each rotation-direction change was handled as a salient point. As shown in FIG. 4B, the kth salient point was represented using $\hat{t}_k \approx \frac{1}{2}(\hat{t}_k^{(e)} + \hat{t}_{k+1}^{(s)})$, where $\hat{t}_k^{(e)}$ denotes the end time of the kth rotation and $\hat{t}_{k+1}^{(s)}$ the start time of the (k+1)th rotation. The timestamps $\hat{t}_k^{(e)}$ and $\hat{t}_{k+1}^{(s)}$ should be close for identifying a salient point. We thus obtained $S_{d_1} = \{\hat{t}_1, \hat{t}_2, \ldots, \hat{t}_{n-1}\}$, where $\hat{t}_k$ is the occurrence time of the kth salient point.

3.3.2 Salient Points on the Helper Side.

(1) Pressing buttons. FIG. 4A shows an example of pairing via pressing a button. In this case, the z-axis of acceleration is the dominant axis (see Section 3.2); the signal along the other two axes is in dashed grey lines. At each salient point of the ground truth, i.e., PressedDownevent, a sharp peak was observed. We retrieved the occurrence time of each sharp peak, and derived the sequence $$S_{d_2} = \{t_1, t_2, \ldots, t_m\}$$

where $t_k$ is the time of the kth sharp peak.

(2) Twisting knobs. According to our study of motion data (see Section 3.2), we used the gyroscope data for detecting salient points, which corresponded to rotation-direction changes. In the example shown in FIG. 4B, the x-axis is the dominant axis. As the rotation direction of the IoT device changed, the signal sign of the gyroscope changed as well. Therefore, we detected salient points by searching for the points of signal sign switches during large-amplitude changes. We extracted a sequence of timestamps of all the salient points. The timestamp sequence is denoted as:

$$S_{d_2} = \{t_1, t_2, \ldots, t_m\}$$

where $t_k$ refers to the occurrence time of the kth salient point.

During a pause, the gyroscope readings were near zero but there may have existed small fluctuations, especially at the start (denoted by the circle in FIG. 4B). To avoid detection of false salient points, such fluctuations were filtered via simple thresholding.

(3) Swiping touchscreens. Each direction change of the swiping produced a salient point in the gyroscope data trace. As shown in FIG. 4C, each salient point corresponded to a sharp sign change due to a swiping-direction change. We obtained a sequence of timestamps:

$$S_{d_2} = \{t_1, t_2, \ldots, t_m\}$$

where $t_k$ is the time of the kth salient point.

(4) Big silence. It is critical to identify the first salient point. After the pairing was initiated (e.g., by long pressing a button), as the user's hand approached the IoT device's button/knob/screen, there may exist some noisy motion data that looked like salient points. To address this, we simply asked the user to touch the button/knob/screen and hold shortly, around 2-3 seconds, before performing the pairing operations. This way, the "big silence" in the motion data worked as an indication that pairing operations followed and the detection of salient points from the motion data could start.

3.3.3 No Clock Synchronization.

To eliminate the need of clock synchronization, we converted each timestamp sequence into a series of time intervals using the equations $\hat{i}_k = \hat{t}_{k+1} - \hat{t}_k$ and $i_k = t_{k+1} - t_k$ for $S_{d_1}$ and $S_{d_2}$, respectively.

We then concatenated the time intervals and called them evidence:

$$E_{d_1} = \{\hat{i}_1 \| \hat{i}_1 \| \ldots \| \hat{i}_{q-1}\} \text{ and } E_{d_2} = \{i_1 \| i_2 \| \ldots \| i_{p-1}\},$$

where $E_{d_1}$ represents the evidence collected by the IoT device, and $E_{d_2}$ by the helper.

Note that clock drift during pairing did not cause an issue here, as the pairing operations took only around three seconds (Section 7.5), leading to 3 ms of drift in the worst case (see Section 3.2 of indicated literature [26]); such small differences between evidence were tolerated by our protocol based on fuzzy commitment (Section 4.1).

Section 4: Protocol for Key Agreement

Once two pieces of evidence are extracted, the two sides use the evidence to mutually authenticate each other and establish a key.

4.1 Challenges and Solution

How to perform secure mutual evidence verification, when there are powerful attacks such as man-in-the-middle (MITM) attacks, is a challenge. Another challenge is that the wristband and the IoT device may have small differences, e.g., due to sensor readings and clock drift, with regard to the observations of salient points.

Failed attempt. To address the two challenges, we first adopted a fuzzy commitment scheme (FCS) building on error correcting codes. [20] Fuzzy commitment schemes have been utilized for proximity-based pairing. [14,32,42] It allows mutual evidence verification without disclosing the evidence to MITM attackers and handles small differences between two pieces of evidence. The sender converts its evidence to an encrypted message, which can be successfully opened only if the receiver owns the evidence that is similar to the senders in the metric of Hamming distance. [20] We called the original fuzzy commitment as vanilla fuzzy commitment.

To conduct the vanilla fuzzy commitment, the evidence needed to first be encoded into a bit-representation. Previous studies converted a value directly to its binary representation, [14] but this encoding method may incorrectly consider two dissimilar (resp. similar) evidence sequences as similar (resp. dissimilar).

For example, given the interval values {121} and {57}, which are encoded as "0111 1001" and "0011 1001", respectively, based on the definition of Hamming distance, which is the number of different digits in the two bit strings, we obtained Ham(121, 57)=1. Since their Hamming distance was very small, the two intervals were considered similar, while in fact their difference was large. As another example, the interval values, {128} and {127}, could be represented as "1000 0000" and "0111 1111", respectively, wherein we determined Ham(128, 127)=8. Thus, the vanilla fuzzy commitment incorrectly considered the two similar interval values very differently.

In short, while the vanilla fuzzy commitment works fine in certain applications, e.g., when the values fall in large ranges, it did not work well in our case as the difference of intervals was not huge.

Solution. To address the problem, we proposed faithful fuzzy commitment, which encoded each time interval by first dividing the interval value by a base value to tolerate small differences and reduced the encoding length and then represented the result as a sequence of consecutive "1" and "0" bits. The distance could then be computed as the Hamming distance between their encodings.

Given the base value B and an interval value i, we derived n=[i/B]. We made sure all intervals had the same length L of encodings. Then, the interval was represented as n consecutive "1" bits, with another L−n "0" bits appended to the end. So, the interval with the value i was encoded as:

$$e(i) = \underbrace{\overbrace{1, 1, \ldots, 1}^{n}, 0, 0, \ldots, 0}_{L} \quad (1)$$

A large base value B led to more efficient key agreement but less precise evidence comparison, and vice versa. We discussed how to select the base value B in Section 7.4. Assuming B=4, consider the two examples above. {121} can be encoded as [121/4]=30 consecutive "1" bits followed by L−30 "0" bits. {57} can be encoded as 14 consecutive "1" bits followed by L−14 "0" bits. Thus, we have Ham(e(121), e(57))=16, which is much larger than Ham(e(128), e(127))=1. Therefore, our faithful fuzzy commitment overcame the limitation of the vanilla fuzzy commitment and made correct decisions.

The encoding can only represent a value between 0 and L*B+(B−1). It worked well in our case as the intervals did not fall in a huge range. We did not claim it as a general encoding solution.

4.2 Protocol Details

Table 1 shows our protocol, which consists of four phases: (1) Initialization. Almost all commercial off-the-shelf devices have some built-in method to initiate the pairing process (e.g., long pressing a button); (2) Extracting Evidence. As the user wearing/holding the helper device preforms pairing operations on the IoT device, each side extracts evidence independently. Here, self-checking is enforced: if there are no pauses detected, the pairing aborts and the helper reminds the user of adding one or more pauses. As illustrated in Section 7.2, pauses are critical to defeat trained mimicry attacks; (3) Fuzzy Commitment. The two devices use the evidence to communicate a "password"; and (4) Password-Authenticated Key Agreement (PAKE). The devices make use of the "password" to agree on a session key. Below, we interpreted the details of Phases (3) and (4).

Fuzzy Commitment. This phase was accomplished using faithful fuzzy commitment and the Reed-Solomon (RS) error correcting code.[38] Given a set of possible words P each with m bits, a set of possible codewords Q each with n bits, and n>m, RS codes were initialized as $$P = F_{2^k}^m \text{ and } Q = F_{2^k}^n$$

where k is a natural number and $2^k$ denotes the number of words (codewords) in P(Q).

The device $d_1$ first randomly selected a "password" P ∈ P using a key generation algorithm (①). Then, P was uniquely mapped to a codeword λ ∈ Q using the RS encoding function (②). This step added redundancy to the original words with n>m, based on polynomials over Galois fields [38], to support error correcting. After that, the commitment process produced an encryption of the codeword λ by hiding it using the evidence $E_{d_1}$. It performed an exclusive-OR (⊕) between $e(E_{d_1})$ and λ, and obtained the commitment δ=$e(E_{d_1})$ ⊕ λ [20,32] where e(i) was the encoding described in Section 4.1 (③). $d_2$ then conducted decommitment using the received δ and $e(E_{d_2})$ to obtain a codeword λ'=$e(E_{d_2})$ ⊕ δ (④). Finally, λ' was decoded to P' using the RS decoding function (⑤). Prior studies offer more detailed interpretations of fuzzy commitment [20].

The effects of this phase were as follows: (1) If $E_{d_1}$ and $E_{d_2}$ are close enough, $d_2$ is able to derive a value P'=P; otherwise, P'≠P; and (2) at this moment, however, regardless that it was a benign device (because of false rejections) or an attacker (who has derived P' using a guess of the evidence), $d_2$ was not sure whether P'=P.

The reason we call P, which is actually a random key value, a "password" was to take offline brute-force attacks (BF-offline) into consideration. If P is directly used as the session key, an offline attacker who has collected the traffic could try every possible evidence and repeat ④ and ⑤ until he found a key that could decrypt the traffic; thus, the entropy of evidence (see Section 7.3) disqualified P to work as a secure shared key. We thus used PAKE, which securely generated a high-entropy shared key from a low-entropy password. [8]

PAKE. We used Diffie-Hellman Encrypted Key Exchange (DHEKE) [5], which led to the PAKE family of methods in IEEE P1363.2 [18], but many other PAKE methods could also work. DH-EKE is a DH-based key exchange method that makes use of a password to defeat MITM attacks, as both A and B are transmitted in encrypted messages.

Parameter Consideration. The security of λ was primarily governed by the size (i.e., $2^k$) of the set of codewords. [20] To provide strong security, k should be larger than 80, which was comparable to RSA-1024. By applying RS, a word of length m was uniquely mapped to a codeword of length n. The maximum number of bits between two codewords that could be corrected is $$Thr = \left\lceil \frac{n-m}{2} \right\rceil.$$

Thus, if and only if, the Hamming distance between two pieces of evidence satisfied Ham($e(E_{d_1})$, $e(E_{d_2})$)≤Thr, the symmetric key P'=P could be established. The value selection for Thr is studied in Section 7.1.

Resilience to Brute-Force Attacks. The forward secrecy of DH ensured that even if P was cracked offline (e.g., recording a video of the user to assist offline analysis of P, or enumerating every possible evidence to reveal P), it could not be used to reconstruct the session key. Thus, offline brute-force (BF-offline) attacks would fail. BF-online would not work either. As PAKE attained zero-knowledge password proof [18], an active man-in-the-middle attacker could perform exactly one guess (unless he got it right, he would learn no information), and a passive eavesdropper learned no information about the password or the generated key.

Section 5: Prototype Implementation

Helper. A user could either wear a wristband or hold a smartphone to perform pairing. We implemented the prototypes on two helpers: (1) an LG® Urbane W200™ Smartwatch, and (2) an LG® Nexus™ 5X Smartphone. We developed an application for the smartwatch running Android™ Wear 2.0, and an application for the smartphone running Android™ 7 to collect the motion data. Both the smartwatch and smartphone were equipped with a Bosch® BMI160 inertial measurement unit containing a triple-axis accelerometer and a triple-axis gyroscope.

Figure 5:
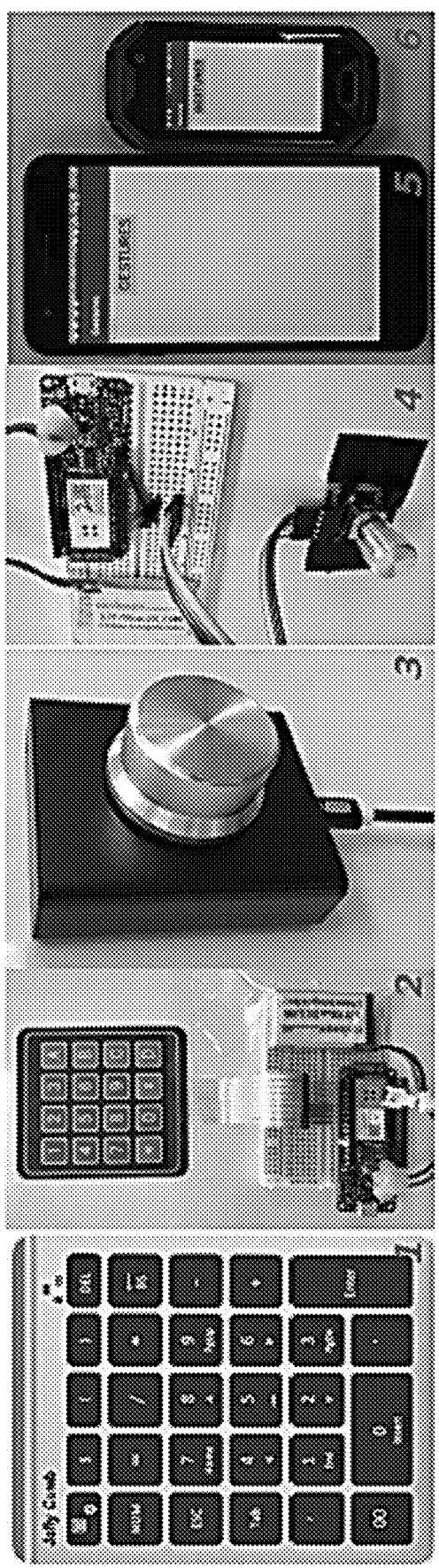
FIG. 5 illustrates photos of six exemplary devices used in accordance with presently disclosed subject matter.

IoT device. A variety of IoT devices were used to build the prototypes, as shown in FIG. 5. In particular, FIG. 5 illustrates photos of six exemplary devices used in accordance with presently disclosed subject matter: (1) Buttons made of two different materials were used: A plastic keypad labeled as 1 and a rubber one labeled as 2. An Arduino® MKR1000 Wi-Fi® Board was adopted to interface with the rubber keypad, and the communication was via the Wi-Fi® module of MKR1000. The plastic one had a Bluetooth® module to communicate with the helper; (2) Knobs with two different sizes were used: A large knob labeled as 3, and a small one labeled as 4. The large knob was a volume controller for desktop; we wrote an interface function to read its data. For the small one, we used an Arduino® MKR1000 Wi-Fi® Board to build its interface; and (3) Touchscreens with two different sizes were used: LG® Nexus™ 5X labeled as 5 had a screen size of 5.2", and Unihertz™ Atom labeled as 6 had a screen size of 2.45". We implemented an application to collect the touch trajectory on the screen and record the coordinates of each touch point in the xy-plane of the screen.

Section 6: Data Collection

We built two datasets: (1) Dataset I was used to measure the accuracy of our system, and (2) Dataset II was used to evaluate the resistance of our system to mimicry attacks. We recruited 20 participants: 14 males and 6 females with ages ranging from 18 to 36. We used three devices, including the large knob, the plastic keypad, and the Nexus™ 5X smartphone, to collect data (the other three devices were used to evaluate the stability of the system, presented in Section 7.4).

6.1 Dataset I for Evaluating Accuracy

To build Dataset I, we asked each participant to wear a smartwatch and perform the pairing operations on each of the three devices for 30 times. In addition, to measure the impact of pauses, each participant was asked to perform two types of pairing each time: one without pauses, and another with random pauses (the user could choose to add one or two pauses during the pairing operations).

Positive pairs. When a participant performed the pairing operations on a device, we collected one positive data pair from the smartwatch and device. Thus, for the pairing operations without pauses, our dataset contained 1,800 (=20×30×3) positive pairs, each with a label s=1; for the pairing operations with random pauses, we also collected 1,800 (=20×30×3) positive pairs, each with a label s=1.

Negative pairs. Assuming two users, $\mu_1$ and $\mu_2$, performed the same pairing operations on two devices, the evidence $E_{d_1}$ from $\mu_1$'s IoT device and the evidence $E_{h_2}$ from $\mu_2$'s helper constituted a negative pair; similarly, the evidence $E_{h_1}$ from $\mu_1$'s helper and the evidence $E_{d_2}$ from $\mu_2$'s device constituted another negative pair.

By randomly selecting two users performing the same pairing operations, we generated 1,800 negative pairs (the same amount as the positive pairs) for the pairing operations without pauses, and 1,800 negative pairs for the pairing operations with pauses, each with a label s=−1.

6.2 Dataset II for Evaluating Resilience to Mimicry Attacks

To build Dataset II, we had 10 participants act as victims and the other 10 as attackers. We considered the three attack settings of mimicry attacks as discussed in Threat Model in Section 2.

For MA-trained, we first asked each victim to perform pairing on each type of device for five times and record a video of each pairing. Each attacker was trained by watching the corresponding video as many times as needed to train herself. The attacker only needed to learn one victim's actions and launch attacks against that victim. During the training, we provided the attackers with immediate feedback on the differences between their evidence and the victims' so they could adapt their operations to mimic better. For each attack setting, each pair of attacker and victim performed the pairing operations with/without pauses on each device for 15 times. Given 4 pieces of evidence: $E_{d_v}$ from $\mathcal{V}$'s device, $E_{h_v}$ from $\mathcal{V}$'s helper, $E_{d_A}$ from $\mathcal{A}$'s device, and $E_{h_A}$ from $\mathcal{A}$'s helper, two kinds of evidence pairs were constructed based on the attackers' goal.

(G1) The first pair consisted of $E_{h_v}$ and $E_{d_A}$, implying that $\mathcal{A}$ attempted to have $\mathcal{V}$'s helper accept a pairing with $\mathcal{A}$'s device.

(G2) The second pair consisted of $E_{d_v}$ and $E_{h_A}$, implying that $\mathcal{A}$ attempted to fool $\mathcal{V}$'s device into pairing with $\mathcal{A}$'s helper.

For each attack setting, we collected 900 evidence pairs for the pairing operations without pauses, containing 450 (=10×15×3) G1 pairs and 450 G2 pairs. We collected the same number of pairs for the pairing operations with pauses.

Section 7: Evaluation

We conducted four in-lab studies to evaluate T2Pair in terms of pairing accuracy, security, stability, and efficiency. The first study (Section 7.1) examined its pairing accuracy. The second (Section 7.2) evaluated the resilience of our system to mimicry attacks. The third (Section 7.3) evaluated the randomness and entropy of evidence. The fourth (Section 7.4) tested the stability of T2Pair under different parameters and experimental settings. The time efficiency was evaluated in Section 7.5. The user study that evaluated the usability of our pairing operations is presented in Appendix A.

7.1 Pairing Accuracy

We used False Rejection Rate (FRR) and False Acceptance Rate (FAR) to measure the pairing accuracy: 1) FRR was the rate that our system failed to pair the legitimate user's IoT device with the helper. A low FRR is important for usability. 2) FAR was the rate that our system paired the legitimate user's IoT device (resp. helper) with the attacker's helper (resp. IoT device). So, a low FAR is critical for security.

Given a pairing operation, T2Pair accepted the pairing if a shared key could be successfully derived from a pair of evidence that had a Hamming distance smaller than the threshold (see Section 4.1). The threshold (Thr) indicated the allowed evidence difference for T2Pair to accept a pairing. A false rejection occurred if T2Pair obtained Ham ($E_{d_1}$, $E_{d_2}$)>Thr for a legal pairing of $d_1$ and $d_2$, and a false acceptance if Ham($E_{d_1}$, $E_{d_2}$)<Thr for an illegal pairing of $d_1$ and $d_3$. The evidence length was defined as the number of time intervals it contained. For pairings with pauses, we set the evidence length to 7 for knobs and 6 for both touchscreens and buttons (see Evidence Length in Section 7.4). For pairings without pauses, we set the evidence length to 8 for all devices.

Figure 6A:
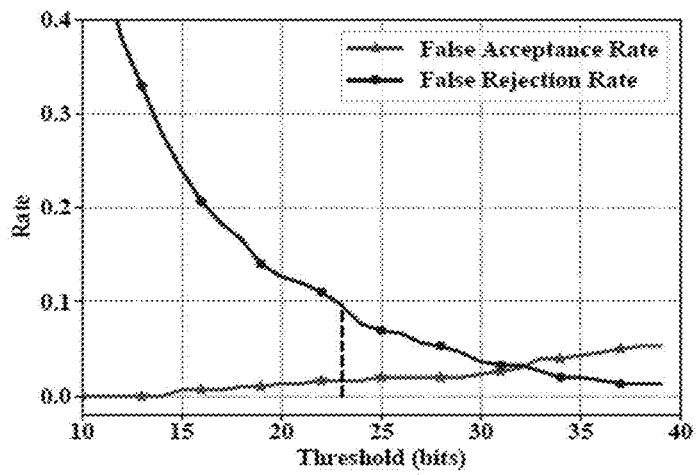
FIGS. 6A-6C illustrate graphical representations of False Acceptance Rates (FARs) and False Rejection Rates (FRRs) with different threshold values for pairing operations without random pauses, including button-based device pairing (FIG. 6A), knob-based device pairing (FIG. 6B), and screen-based device pairing (FIG. 6C)
Figure 6B:
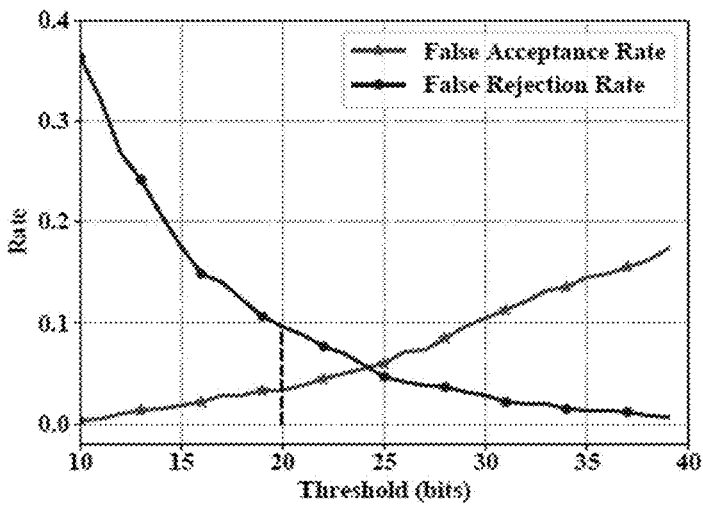
Figure 6C:
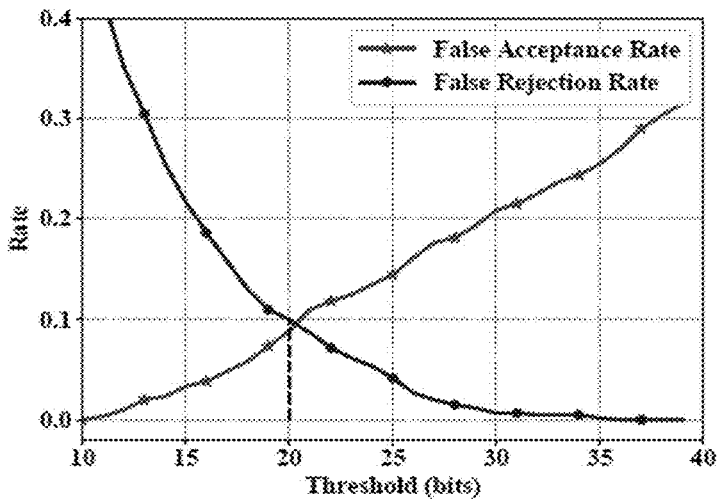
Figure 7A:
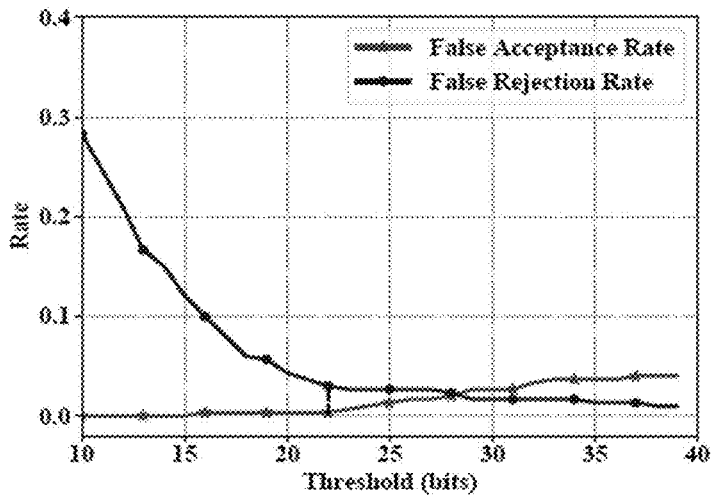
FIGS. 7A-7C illustrate graphical representations of False Acceptance Rates (FARs) and False Rejection Rates (FRRs) with different threshold values for pairing operations with random pauses, including button-based device pairing (FIG. 7A), knob-based device pairing (FIG. 7B), and screen-based device pairing (FIG. 7C)
Figure 7B:
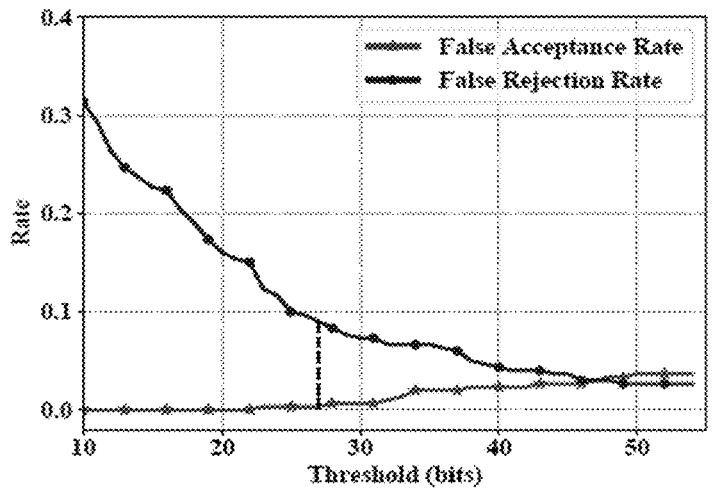
Figure 7C:
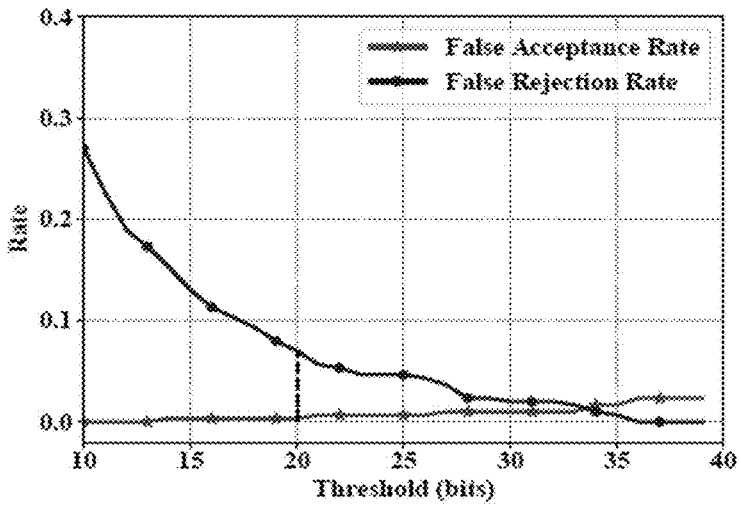

We used Dataset I to evaluate the accuracy of T2Pair and compared the performance between the pairing operations with and without pauses. FIG. 6 and FIG. 7 showed the performance in terms of FAR and FRR by varying the threshold of Hamming distance. We chose the base value as 10 ms (Base Value is studied in Section 7.4). For example, FIGS. 6A-6C illustrate graphical representations of FARs and FRRs with different threshold values for pairing operations without random pauses, including button-based device pairing (FIG. 6A), knob-based device pairing (FIG. 6B), and screen-based device pairing (FIG. 6C). FIGS. 7A-7C illustrate graphical representations of FARs and FRRs with different threshold values for pairing operations with random pauses, including button-based device pairing (FIG. 7A), knob-based device pairing (FIG. 7B), and screen-based device pairing (FIG. 7C).

As expected, the larger the threshold, the lower the FRR (better usability), but the higher the FAR (worse security). FIG. 6 presents the results for pairings without pauses. By choosing the threshold that yields an FRR 0.10 (we considered an error below 0.10 was reasonably good for usability), we could achieve an FAR 0.02, 0.03, and 0.09 for buttons, knobs, and screens, respectively (see the vertical dashed lines). An FRR of 0.10 meant that on average 10 out of 100 pairing attempts failed, and thus, a user was expected to perform 100/90=1.1 pairing attempts for pairing one device.

FIG. 7 shows the performance when random pauses are introduced during pairing. We found that the FAR could be significantly improved—the FAR grew very slowly as the threshold value increased. These results indicated that random pauses could enhance the discriminability of each pairing. If security was particularly important for certain applications, we could set the FAR as 0.00, and T2Pair achieved (FAR, FRR)=(0.00, 0.03) for buttons, (0.00, 0.09) for knobs, and (0.00, 0.07) for screens (see the vertical dashed lines). Thus, security was much improved with usability kept good. But if vanilla fuzzy commitment (Section 4.1) was used, we could only achieve (FAR, FRR) (0.00, 0.81) for buttons, (0.00, 0.48) for knobs, and (0.00, 0.73) for screens, showing heavily degraded accuracies.

7.2 Resilience to Mimicry Attacks

This section evaluated the resilience of T2Pair (based on the thresholds selected in Section 7.1) to mimic attacks for two types of pairing operations: one without pauses (Type-I) and the other with pauses (Type-II). We used FAR to measure the success rate of attacks and evaluate the resilience using Dataset II (see Section 6.2).

Resilience to MA-obstructed. The attacker ($\mathcal{A}$) stood behind the victim ($\mathcal{V}$) a distance of 2-3 meters and did not have a clear view of $\mathcal{V}$'s hand movements. As shown in Table 2, for the pairing operations of Type-I, T2Pair could successfully identify 96.0%, 95.3% and 90.7% of attacks on buttons, knobs, and screens, respectively. The performance could be greatly improved if the random pauses were considered—specifically, for the Type-II operations, T2Pair could successfully defend against all the attacks on knobs, and 99.3% of attacks on screens and buttons.

Resilience to MA-clear. $\mathcal{A}$ stood next to $\mathcal{V}$ and had a clear view of $\mathcal{V}$'s hand movements. As shown in Table 2, for the Type-I operations, the attackers' success rate increased, especially for the screen-based device. However, for the Type-II operations, the attackers' success rate was still very low. The results demonstrated that the random pauses during each pairing could increase the difficulty for attackers to mimic the victims' hand movements. Thus, the pairing operations with random pauses were more secure.

Resilience to MA-trained. How to train the attacker is described in Section 6.2). Compared to the Type-II operations, FARs for the Type-I operations increased sharply (up to 27.4%), which revealed a noticeable weakness of pairing without pauses. The pauses made the intervals more unpredictable and difficult to mimic. To eliminate the weakness, our protocol performed self-checking at Phase 2 in Table 1, which aborted pairing if there were no pauses.

7.3 Randomness and Entropy

Randomness. The randomness level of the time interval between two consecutive events directly affected the entropy of evidence. We noticed that it ranged from large values when the user pauses to small ones when she pressed/twisted/swiped quickly. It was challenging to examine their randomness as plenty of samples were required. Prior work [14,30] also confirmed this challenge and directly assumed the human generated events were random.

We instead examined the randomness of the collected intervals over a limited range. Similar to H2H [39], we studied whether the six least significant bits of the time intervals were randomly distributed. We verified it by applying NIST statistical test suite [40] on the distribution of our time interval bits; it is a widely used randomness test suite. [39,45,46] Our dataset, which was subsampled from Dataset I and II based on users, had a size of 19.2 Kbits consisting of 3200 intervals for each type of pairing operations.

The outputs of the NIST tests are p-values. A p-value represented the probability that the input bit sequence was generated by a random bit generator. [40] If a p-value was less than a chosen critical value (usually 0.01), the null hypothesis for randomness was rejected. Table 3 shows that all the p-values are larger than 0.01 for the three types of devices. The results confirmed the randomness.

Entropy analysis. We used $I_1$ to denote the set of intervals, each of which was generated without pauses, and $I_2$ to denote the set of intervals, each with a pause. The possible range of $I_1$ was related to the specifications of a given device (e.g., size, rotation/swiping range) and the device users' behavior habit, while the range of $I_2$ was mainly determined by device users. As many human characteristics showed normal distributions [7], we assumed $I_1$ and $I_2$ among all users followed a normal distribution each. The entropy (in bits) of a time interval (with mean denoted as p and standard deviation as a) could be computed as follows [35].

$$E_i = \tfrac{1}{2} \log_2(2\pi e \sigma^2) \tag{2}$$

Assuming each piece of evidence contained $n_1$ intervals from $I_1$ and $n_2$ intervals from $I_2$, the evidence entropy could be computed as:

$$I_E = n_1 * E_1 + n_2 * E_2 + \log_2 \binom{n_1 + n_2}{n_2} \tag{3}$$

The term $$\binom{n_1 + n_2}{n_2}$$

was introduced to account for the random occurrence positions of the $n_2$ pauses in the evidence.

The total time generating a piece of evidence was denoted as T, with the bit rate being $I_E/T$.

Figure 8A:
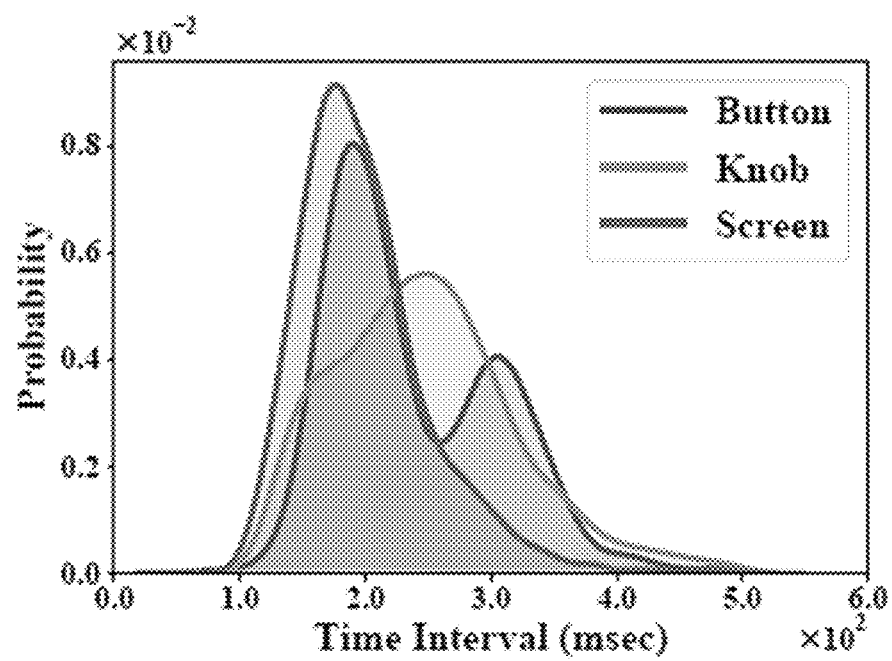
FIG. 8A is a graphical representation showing the distributions of the time intervals of $I_1$ (the set of intervals, each of which is generated without pauses) among all the users.
Figure 8B:
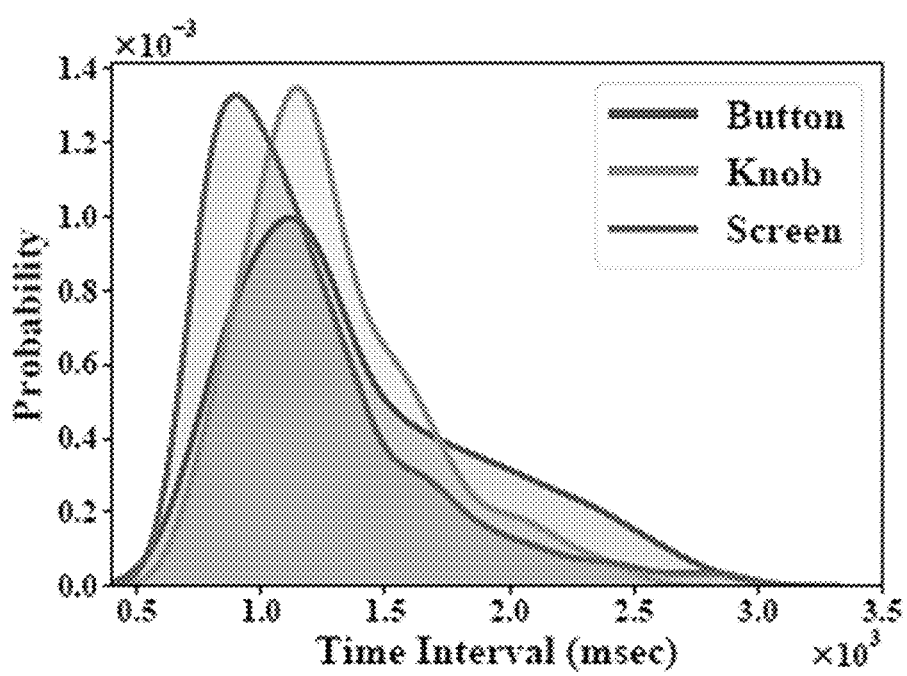
FIG. 8B is a graphical representation showing the distributions of the time intervals of $I_2$ (the set of intervals, each of which is generated with a pause) among all the users.

Entropy evaluation using a real-world dataset. FIGS. 8A and 8B show the distributions of the time intervals of $I_1$ and $I_2$ among all the users. FIG. 8A is a graphical representation showing the distributions of the time intervals of $I_1$ (the set of intervals, each of which was generated without pauses) among all the users, while FIG. 8B is a graphical representation showing the distributions of the time intervals of $I_2$ (the set of intervals, each of which was generated with a pause) among all the users.

We tested the normality of the distributions with one-sample Kolmogorov-Smirnov testing. [24] For each device, more than 86% of the time intervals followed the normality assumption. Thus, most of the data for each device could be abstracted into a normal distribution. Prior studies [10,21] of keystrokes and/or screen touches were consistent with our finding.

We then used the pairing operations on buttons as an example to compute the entropy. As summarized in Table 4, the intervals of $I_1$ mostly fell in [100 ms, 500 ms] with the standard deviation $\sigma_1$ 67 ms, while those of $I_2$ in [800 ms, 3000 ms] with the standard deviation $\sigma_2$ 501 ms. With the base value=10 ms (see Section 7.4), $\sigma_1$ and $\sigma_2$ became 6.7 and 50.1, respectively. According to our entropy definition in Equation 2, the entropy for one interval in $I_1$ was around 4.8 bits, and in $I_2$, around 7.7 bits. As each piece of evidence consisted of 4 (or 5) intervals of $I_1$ and 2 (or 1) intervals of $I_2$, the total entropy was around 38.5 (or 34.3) bits. The mean values for the intervals of $I_1$ and $I_2$ were 238 ms and 1402 ms, respectively, so the total time for generating a piece of evidence was 3756 ms (or 2592 ms). The bit rate was around 10.3 bit/s (or 13.2 bit/s).

7.4 Study of Parameters and Stability

Figure 9A:
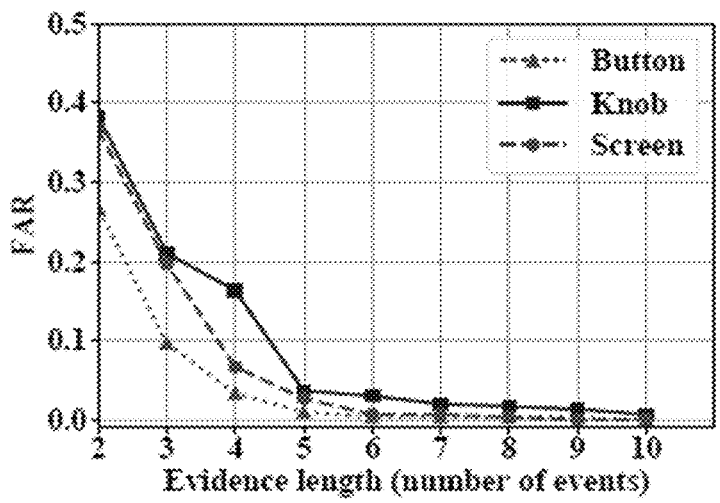
FIGS. 9A-9F illustrate graphical representations of various impacts of different parameters and experimental settings involving the presently disclosed subject matter, with FIG. 9A illustrating FAR vs. evidence length.
Figure 9B:
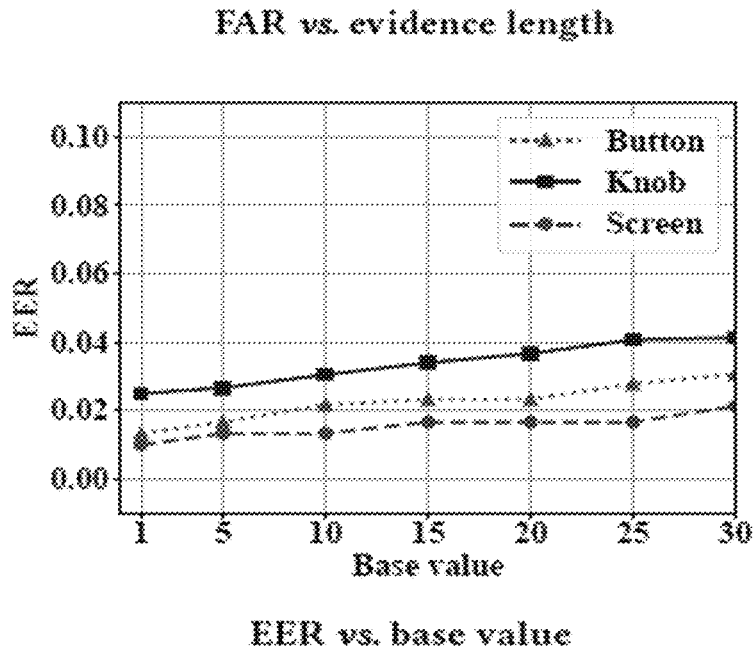
Figure 9C:
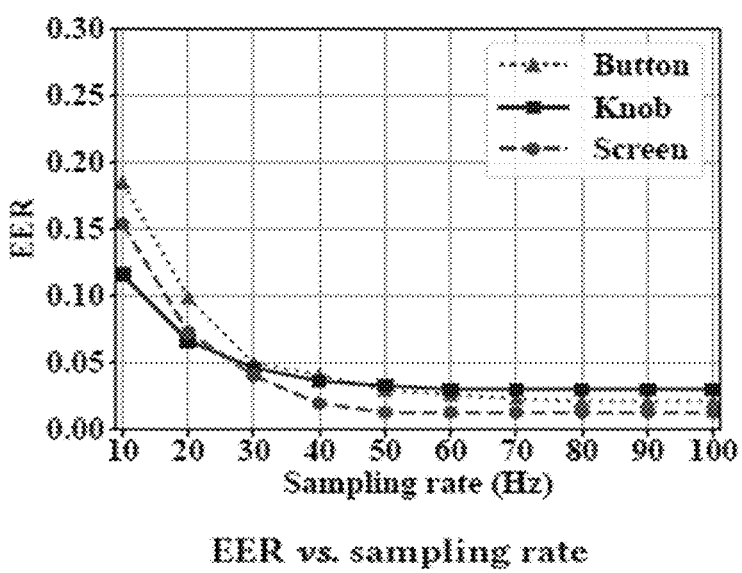
Figure 9D:
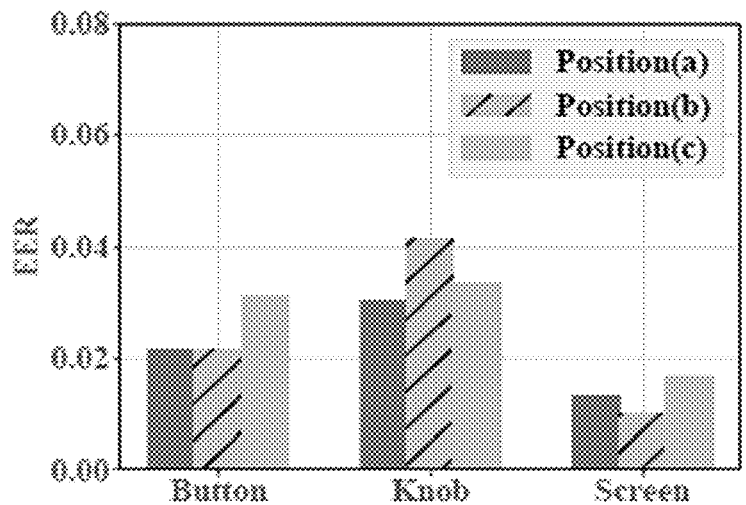
Figure 9E:
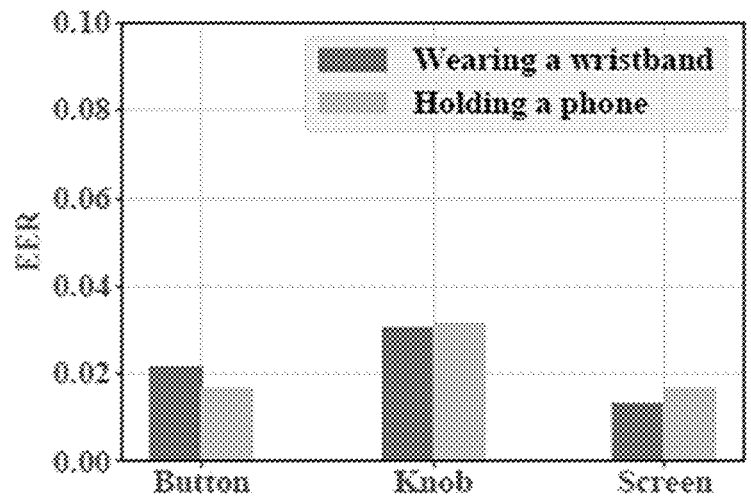
Figure 9F:
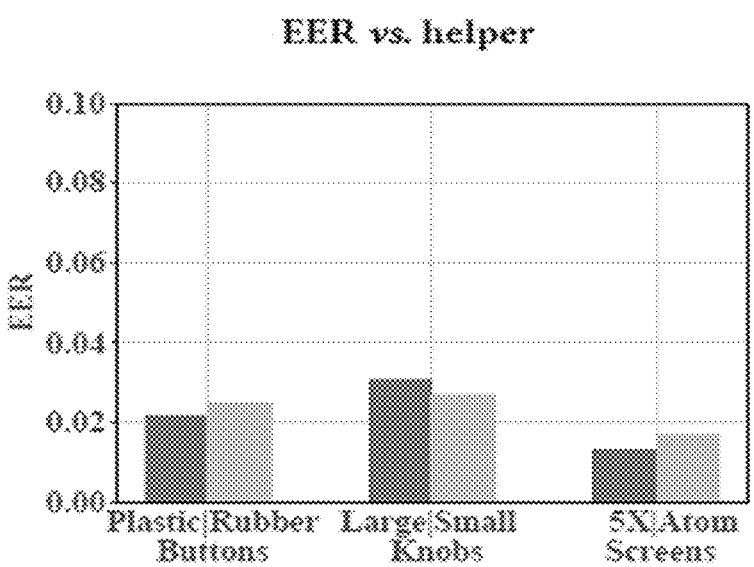

For the following experiments, we focused on pairing with pauses. FIGS. 9A-9F illustrate graphical representations of various impacts of different parameters and experimental settings involving the presently disclosed subject matter, with FIG. 9A illustrating FAR vs. evidence length; FIG. 9B illustrating EER vs. base value; FIG. 9C illustrating EER vs. sampling rate; FIG. 9D illustrating EER vs. device position; FIG. 9E illustrating EER vs. helper; and FIG. 9F illustrating EER vs. IoT.

Evidence length. The evidence length was represented as the number of time intervals, which was related to the number of salient points. Longer evidence provided better security, but also required longer time to finish the pairing, which sacrificed usability. Thus, evidence length is a trade-off between security and usability.

To study its impact, we set the FRR to a fixed value 0.05 and examined the changes of the FAR as the evidence length varied. FIG. 9A shows the FARs with different evidence lengths for the three types of devices. As expected, if the evidence length was longer, the FAR was lower, the security was better. For knob-based devices, an evidence length 7 was appropriate as a longer length could only improve the FAR a little bit. For both button-based and screen-based devices, the FAR was below 0.01 if the evidence length was longer than 6. Hence, 6 was an appropriate length for them.

Base value. The base value was used to encode the time intervals. In general, a larger base may generate a less accurate encoding of the time interval because of more coarse approximations, but it could create a shorter encoding of the evidence that was more efficient. Thus, selecting an appropriate base value was a trade-off between accuracy and efficiency. For simplicity, we used EER to study the impact of the base by weighting the FAR and FRR equally.

FIG. 9B shows the EERs for the three types of pairing by varying the base from 1 to 30 ms. We found that the EERs grew slowly as the base increased. Although a base smaller than 10 could slightly improve EERs, it also yielded long evidence. Considering both accuracy and efficiency, we chose the base value as 10 ms.

Sampling rate. The sensor data from the wristband ("helper") was used to extract salient points and generate the evidence. A low sampling rate of the sensor data may result in inaccuracy in detecting salient points. While a high sampling rate could help capture more subtle motions, it also introduced a higher burden on data collection. An optimal sampling rate needed to be determined by considering both accuracy and efficiency.

FIG. 9C presents the performance of T2Pair by changing the sampling rate from 10 Hz to 100 Hz at a step of 10 Hz. We observed that button clicking required a sampling rate higher than 80 Hz to achieve the best performance, and knob rotation and screen swiping only required a sampling rate higher than 50 Hz. We thus selected a sampling rate of 80 Hz, 50 Hz, and 50 Hz for button clicking, knob rotation, and screen swiping, respectively.

IoT device position. IoT devices may be installed/placed at different positions based on the demand (e.g., whether needing to be connected to a power source) or the user's preference. We examined three common positions that a device may be installed/placed: (1) plugged into a wall outlet; (2) placed on a table; and (3) held in a hand.

FIG. 9D shows the EERs for the three types of pairings in terms of different device positions. For buttons and screens, T2Pair performed slightly better when the devices were in the positions (a) and (b), while for knobs, the positions (a) and (c) achieved slightly better performance. Overall, the results indicated that different device positions had little impact on the pairing performance.

Different kinds of helpers. Besides wristbands, we also tested the feasibility of holding a smartphone to perform pairings. We presented the EERs in FIG. 9E for the three types of pairings using the two different helpers: wristband and smartphone. When the smartphone was used, T2Pair achieved an EER of 0.017, 0.031, and 0.017 for buttons, knobs, and screens, respectively. No obvious difference was observed in the pairing performance between the two helpers. We thus concluded that holding a smartphone for pairings was feasible. Nevertheless, we found the usability was not satisfactory when the user holding a smartphone twisted a small knob.

Different sizes and materials of IoT devices. We further studied whether T2Pair could work well on IoT devices with different sizes and materials. We had two knob-based devices (a large knob and a small knob), two button-based devices (a rubber keypad and a plastic keypad), and two touchscreens (a smartphones Nexus™ 5X and a Unihertz™ Atom that have different screen sizes). Dataset I was collected using the large knob, the plastic keypad, and the Nexus™ 5X with a relatively large screen. We then recruited an additional 5 participants to perform the pairing operations on the other three devices.

FIG. 9F shows the EERs for the six devices. For any two devices with the same type of UI, we did not observe any significant difference between their performance. Thus, the device size and material had little impact on the pairing performance of T2Pair.

7.5 Efficiency

We next evaluated the efficiency of the pairing operations; here, we only considered the pairing operations with random pauses. Specifically, we measured the time used for performing the pairing operations with an evidence length of 7 for knobs, 6 for screens, and 6 for buttons (see Evidence Length in Section 7.4).

For knobs, screens, and buttons, the mean time for pairing was 2.8 s (SD=0.85), 2.3 s (SD=0.66), and 3.2 s (SD=0.93), respectively. The pairing operations required very short time to finish and were efficient.

We also measured the time used for running fuzzy commitment and PAKE to establish a shared key between two parties. The average execution time on the smartwatch and the Arduino® controller was 0.9 s (SD=0.37) and 0.7 s (SD=0.25), respectively.

Note that the "big silence" (≤3 s) before each pairing was not included here; however, it was considered in the Usability Study in Appendix A.

7.6 Comparison with Other Approaches

Table 5 shows the comparison of T2Pair with some prior works. Our work achieved better accuracies than these works [1,30,49]. Moreover, T2Pair was more efficient than Tap-to-Pair [49], SFIRE [12], and Checksum [1] in terms of the pairing time, e.g., Tap-to-Pair needed at least 15 seconds, while our system only needed up to 4.1 seconds (i.e., the maximum time observed for performing pairing operations 3.2 s plus the time running our fuzzy commitment 0.9 s). Note that each pairing approach required some initialization phase, and the statistics about the initialization time were not available in many of the works; thus, we excluded the initialization time for fair comparison. However, even though the initialization time ("big silence") was considered, the maximum time of 7.1 s (=4.1+3) still showed our pairing was fast. In contrast, Perceptio [14] took hours or even days for pairing.

Section 8: Related Work

Proximity-based pairing. Some approaches [19,29,37] transformed the Received Signal Strength (RSS) values into a key, while others exploited Channel State Information (CSI) [25,46]. As a user moves her smartphone near an IoT device, Move2Auth [48] and SFIRE [12] authenticated the device by checking whether the RSS changes correlated the motion trace of the smartphone. To create RSS changes, Tap-to-Pair [49] had a user tap the wireless transmitter on an IoT device following the instructions displayed by another device (e.g., a smartphone) to authenticate the IoT device. Many only authenticated the IoT device to the user's mobile device [12,48,49] but not the other way around. Hence, IoT devices may only get paired with the attacker's device, while T2Pair provided mutual authentication.

The changes in ambient context, such as audio [42] and luminosity [32], could also be used to prove co-presence. Perceptio [14] clustered contextual information detected by devices equipped with different sensors to derive a key. Like our work, it also aimed at a pairing approach applicable to heterogeneous IoT devices, but it assumed there existed a physical security boundary (e.g., the house wall) and no malicious devices within the boundary. In contrast, T2Pair largely eliminated the threat of co-located malicious devices. Perceptio had the advantage of pairing multiple devices without human intervention, but it took a very long time for pairing some devices (e.g., a laundry washer that is used once per week and a glass-break sensor that is triggered only once during multiple years), while T2Pair took seconds for pairing a device. Furthermore, Perceptio had no guarantee whether a device could be paired correctly, especially for devices (e.g., in different floors) that perceive different contextual information. Both wireless signal changes and the ambient context could be sensed, and thus exploited, by co-located malicious devices.

Physical contact-based pairing. Some approaches required users to have physical contact with IoT devices for pairing purposes. By shaking [30] or bumping [15] two devices simultaneously, the motion data on both devices became correlated and could be used for pairing. Touch-And-Guard [45] had the user wearing a wristband touch the target IoT device, and the wristband's vibration motor created resonance, which was measured by the accelerometers of both sides and used for pairing. Sethi et al. [43] required users to perform synchronized drawings on two touchscreens, with the resulting drawings used for pairing. By shaking [36] or moving [1] an IoT device according to the public key shown on the display, the key was authenticated. However, all these approaches required inertial or touch sensors embedded in the IoT device or a metal pin on its surface [47], which were not available on many IoT devices. While many authentication approaches [27,28,33] based on physical contact (including our prior work P2Auth [23]) have been proposed, they all assumed a secure communication channel between devices, while the pairing task could not assume it.

There existed other approaches that did not fall in either of the two categories above. SiB [31] authenticated other device's public key by taking a picture of a 2D bar code encoding the hash of the public key of the other device. VIC [41] improved it by presenting the key with a binary display. Many vendors embedded a hard-coded password into the firmware of an IoT device and printed the password on the user manual, so the vendor had to carefully make sure the device and the unique manual were packaged together correctly, which is a burden to vendors [12,48]. Some vendors simply used an identical password for all devices, which is a critical security flaw. Moreover, given an IoT device (such as a smart blood-pressure meter in Walmart®) that needed to get paired with many users' personal mobile devices, a single password for all users was insecure, while T2Pair provided a secure and usable solution.

Section 9: Limitations

T2Pair largely eliminated the threat of co-located malicious devices, but not completely. If a nearby malicious device (or an attacker) had a camera that pointed at the user performing authentication, T2Pair was vulnerable to man-in-the-middle attacks assisted by computer vision techniques. Similarly, if the authentication operations generated noises, for example, in the case of pressing a button, a nearby malicious device which had a microphone could also be used to facilitate MITM attacks. How to mitigate side-channel attacks that infer information from noises has been studied [3,4]. It is worth pointing out that, as analyzed in Section 4.2, offline attacks based on recorded videos or audios did not work.

It was not very usable to hold a large smartphone and twist a small knob, but given a large knob (e.g., a Nest® Thermostat), a button, or a touchscreen, it was not an issue. As wearable devices, such as smartwatches and fitness trackers, become increasingly popular, the usability of T2Pair can benefit from the trend.

Section 10: Conclusion

IoT devices lack traditional user interfaces and are diverse in nature. A secure pairing approach that is applicable to heterogeneous IoT devices is urgently needed. We have presented T2Pair, which is secure and applicable to a large variety of IoT devices. It can be applied to IoT devices without requiring any hardware modifications, sensor calibration, or clock synchronization. We designed very simple physical operations that allow users to finish a pairing process conveniently in a few seconds. We proposed faithful fuzzy commitment, which ensures small distances between encodings faithfully indicate small differences between the encoded values, leading to high pairing accuracy. Pauses and self-checking were proposed to enhance the resilience of T2Pair to powerful attacks. A comprehensive evaluation, along with a user study was performed, showing its high security, usability, stability, and efficiency.

Appendix A: Usability Study

Figure 13C:
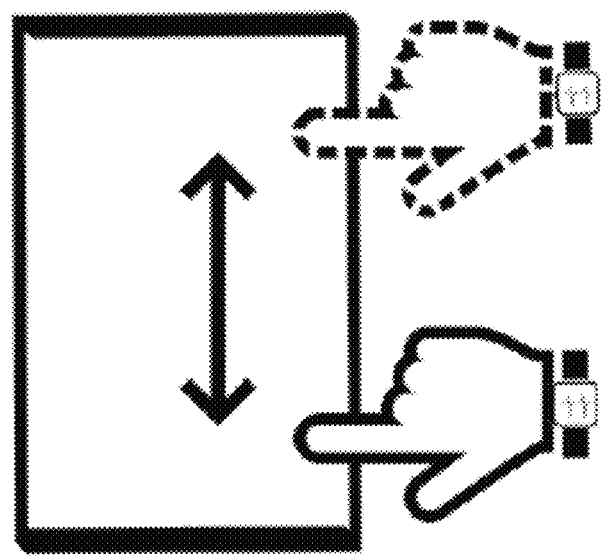
FIG. 13A-FIG. 13C illustrate representative authentication gestures or movements as discussed herein, including clicking a button, twisting a dial or knob, and swiping a screen, respectively.
Figure 13B:
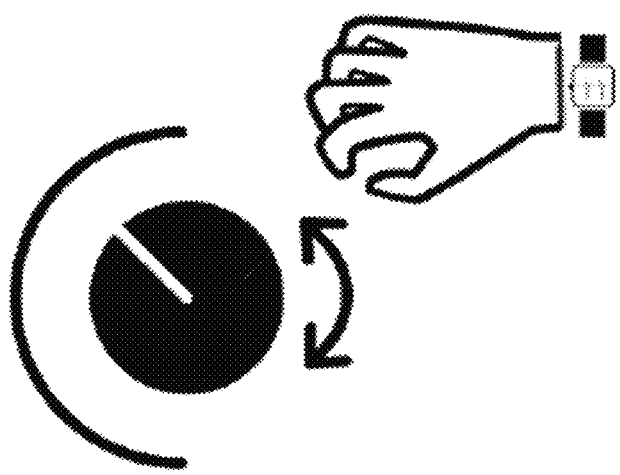
Figure 13A:
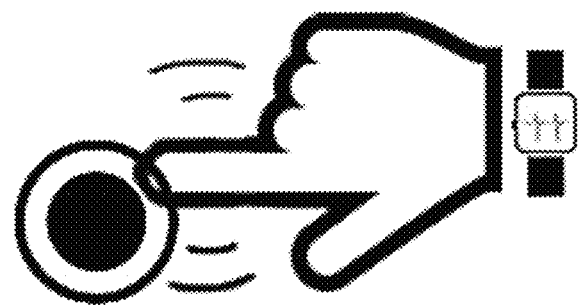

FIG. 13A-FIG. 13C illustrate representative authentication gestures or movements as discussed herein, including clicking a button, twisting a dial or knob, and swiping a screen, respectively. As shown in each of FIGS. 13A, 13B, and 13C, a hand is represented wearing a wristband. In particular, FIG. 13A represents repetitive button clicks, FIG. 13B represents twisting knobs back and forth, and FIG. 13C represents zig-zag or other swiping on touchscreens.

This study investigated the usability of T2Pair and compared it with the password-based pairing mechanism as the baseline, which is currently one of the most widely used pairing mechanisms.

A.1 Recruitment and Design

We recruited 20 participants (9 females) by posting the recruitment flyers on the university campus. The study was advertised as "evaluating the usability of different pairing mechanisms for IoT devices." Most participants were not from the CS department and none of them had computer security background. Specifically, 3 participants were local residents near the campus, 15 were students, and 2 were staff/faculty members. Their ages ranged from 20 to 70. Considering the social desirability bias, we did not make the participants aware that T2Pair was a mechanism that we were working on. Instead, we informed them that we were investigating the usability of different pairing methods. For the password-based mechanism, as a Wi-Fi® password usually requires a minimum of 8 alphanumeric characters [17], we randomly created an 8-char alphanumeric password and showed the password to the participants before pairing.

The experiment was conducted in a lab environment. We first asked each participant to sign a consent form and fill out an initial survey to collect the demographic information. We then introduced the two pairing mechanisms (i.e., T2Pair and the password-based mechanism) to them in a random order to avoid the learning bias. Specifically, for T2Pair, we introduced the three pairing operations with respect to the three types of IoT devices, while a smartphone was used for inputting a password. Next, each participant was instructed to perform two pairing attempts on each of the three IoT devices, as well as the smartphone, to get familiar with T2Pair and the password-based mechanism. These attempts were excluded from further analysis. After that, each one performed another three pairing attempts on each IoT device and the smartphone, respectively.

Finally, the participants were asked to rate the following five statements to examine user preferences and usability (the rating score is from 1 to 5, where 1=strongly disagree, and 5=strongly agree): (A) I thought the pairing method was easy to use; (B) I am satisfied with the amount of time it took to complete the pairing; (C) I thought the pairing method was convenient; (D) I would imagine that most people would learn to perform the pairing very quickly; and (E) I would be happy to use this pairing method frequently. The questions were inspired from the metrics used in previous studies [6,22] and adapted based on SUS [9]. We did not use all 10 questions in SUS as some did not fit our scenario. At the end of the experiment, we conducted a brief interview with the participants to gain insights into what they liked and disliked about each mechanism.

A.2 Usability Results

Figure 10:
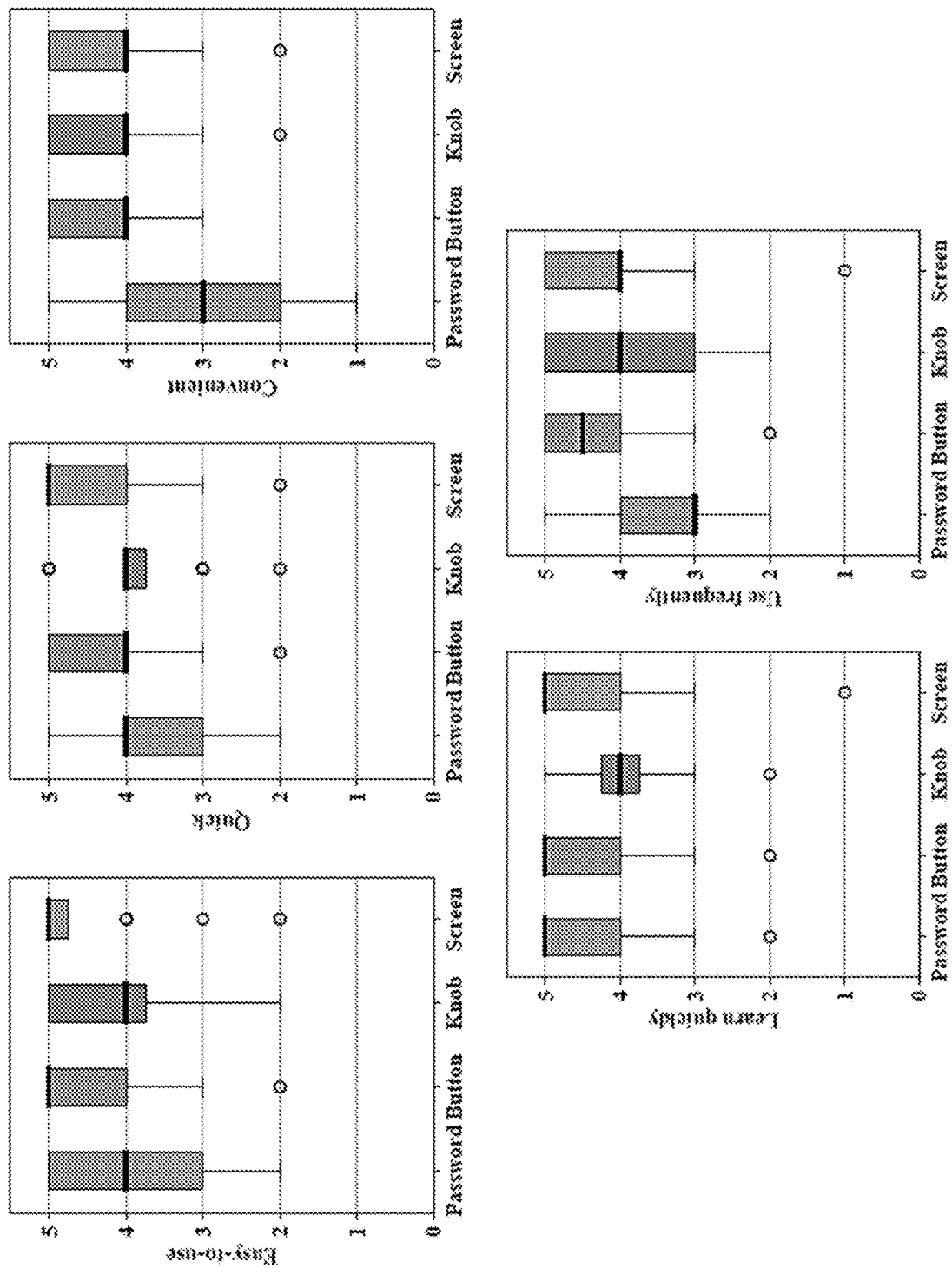
FIG. 10 graphically illustrates usability results based on survey questions of users, adapted from SUS [9]
Figure 11E:
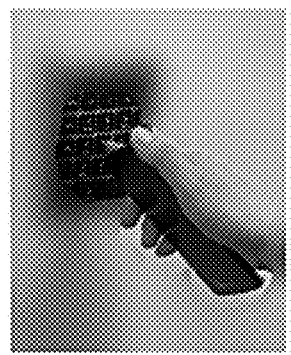
Figure 11F:
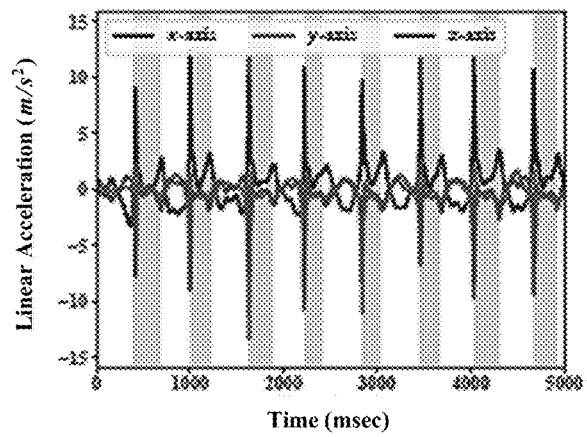
Figure 11G:
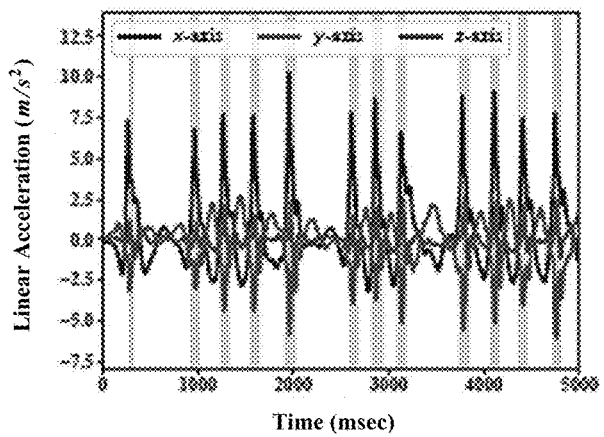
Figure 11H:
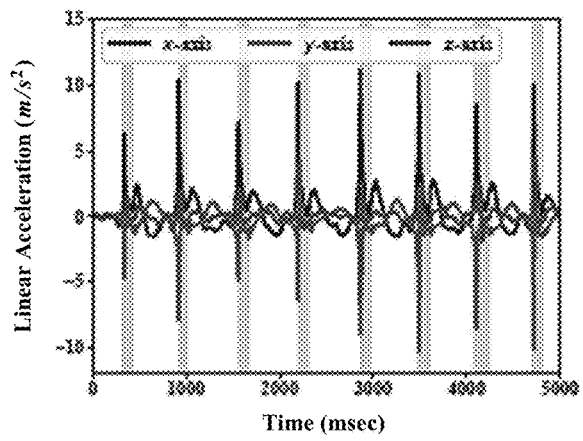
Figure 12A:
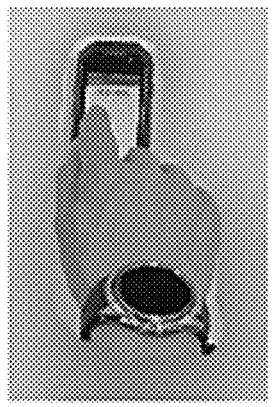
FIG. 12A-FIG. 12H illustrate representative gyroscope data captured when three different users swipe touchscreens, and their correlation with swiping operations, with the user wearing a smartwatch (FIG. 12A-FIG. 12D) or holding a smartphone (FIG. 12E-FIG. 12H)
Figure 12B:
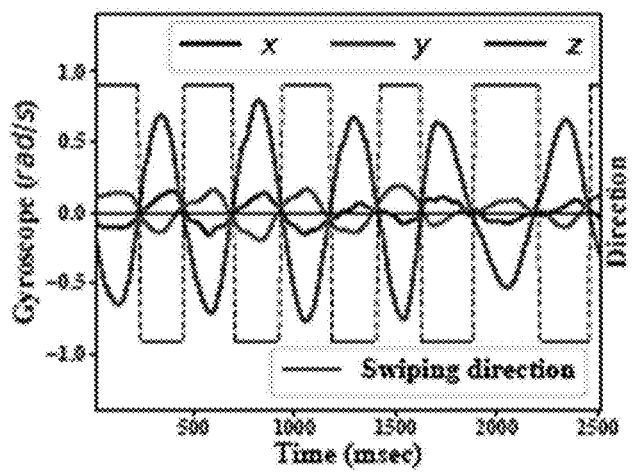
Figure 12C:
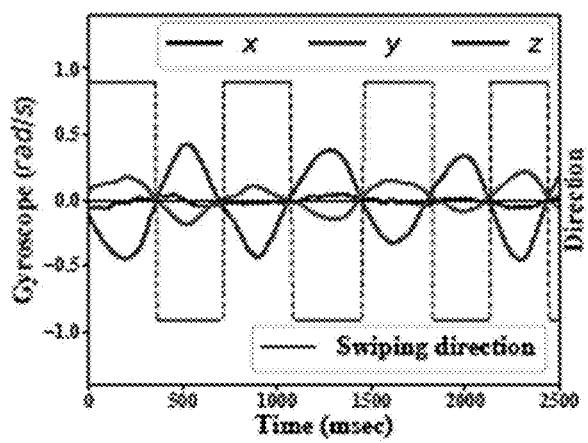
Figure 12D:
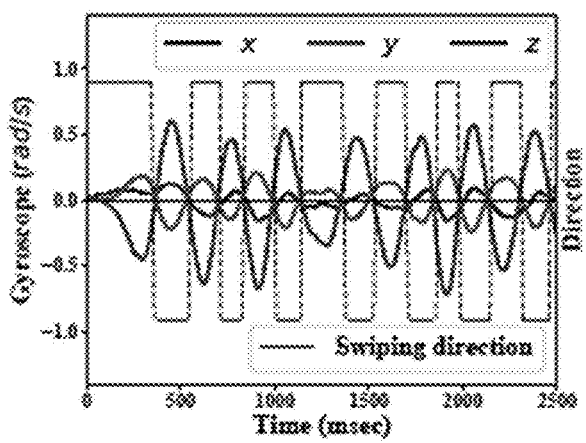
Figure 12E:
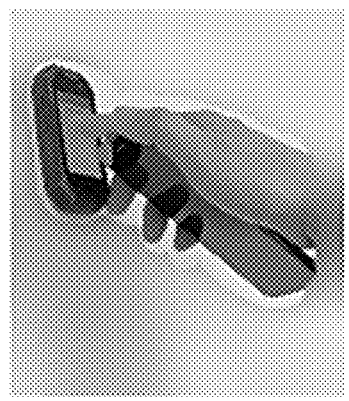
Figure 12F:
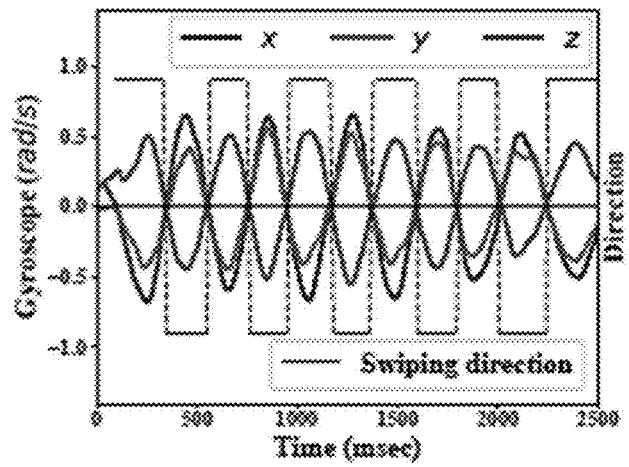
Figure 12G:
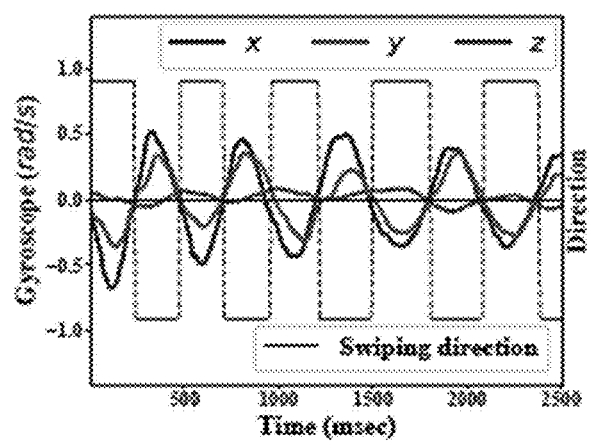
Figure 12H:
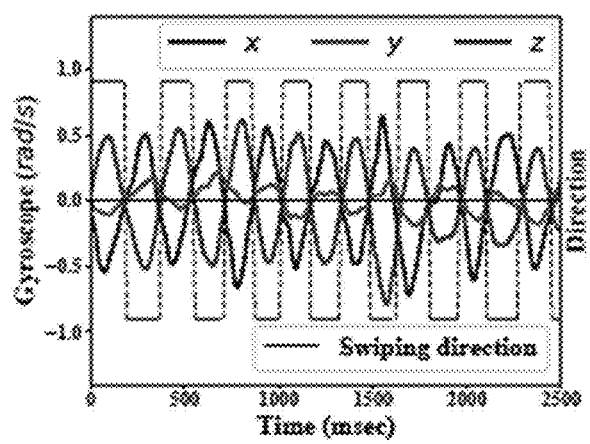

Perceived usability. We investigated the usability from five aspects based on the five statements above: Easy to use, quick, convenient, learn quickly, and use frequently. FIG. 10 shows the results. In particular, FIG. 10 graphically illustrates usability results based on survey questions of users, adapted from SUS [9]. The overall scores for button clicking, knob twisting, and screen swiping were (21.70±3.29), (19.80±3.76), and (21.65±3.54), respectively. For password-based pairing, the overall score was (18.45±3.37).

To analyze the statistical significance of these results, we first hypothesized that T2Pair showed similar usability as a password. We used the one-way ANOVA test to examine the hypothesize. The result of the one-way ANOVA test showed that (1) there were significant differences between button clicking and inputting an 8-char password ($F (1, 19)=9.057$, $p=0.005<0.05$) and between screen swiping and inputting password ($F (1, 19)=8.149$, $p=0.007<0.05$), and thus, our hypothesis could be rejected; and (2) there was no significant difference between knob twisting and inputting password ($F (1, 19)=1.358$, $p=0.251$). Therefore, we concluded that users perceived better usability with button clicking and screen swiping than using an 8-char password, and similar usability for knob twisting and using an 8-char password.

Pairing time. We did not consider the time used for running the pairing protocol as we only focused on the time used by the user. For T2Pair, the mean time for performing a pairing on the button, knob, and screen was 5.2±0.57 s, 6.0±0.83 s, and 5.6±0.73 s, respectively. With respect to a password, the mean time for reading and inputting an 8-char alphanumeric password was 9.5±0.78 s. Thus, our mechanism was more efficient.

Failure rate. For T2Pair (based on the thresholds selected in Section 7.1), each participant performed three attempts on each device; there were 60 pairings for each device. We saw 3 failures out of 60 attempts for button, 2 failures for knob, and 4 failures for touchscreen. Then, each one read and entered a given password three times on the smartphone; there were 60 pairings and 5 failures. Thus, T2Pair had a slightly lower failure rate than the password-based mechanism.

Feedback. We also collected their comments about the advantages and disadvantages of our three pairing operations from different perspectives. Here, we reported some representative comments: Comments from seven subjects indicated that they liked the button clicking pairing operations as they required little effort and/or burden; some also mentioned that twisting the knob for too many rounds could lead to fatigue, but the 7 twistings used by T2Pair were acceptable.

Appendix B: Sensing Pairing Operations (Buttons and Screens)

For the correlation of IMU data and pairing operations, see Section 3.2 of this disclosure.

While certain embodiments of the disclosed subject matter have been described using specific terms, such description is for illustrative purposes only, and it is to be understood that changes and variations may be made without departing from the spirit or scope of the subject matter.

REFERENCES

[1] Imtiaj Ahmed, Yina Ye, Sourav Bhattacharya, N. Asokan, Giulio Jacucci, Petteri Nurmi, and Sasu Tarkoma. 2015. Checksum Gestures: Continuous Gestures As an Out-of-band Channel for Secure Pairing. In *Proceedings of the 2015 ACM International Joint Conference on Pervasive and Ubiquitous Computing*.

[2] Amazon. 2019. AWS IoT Button. https://aws.amazon-.com/iotbutton/. Accessed: 2019-06-04.

[3] S Abhishek Anand and Nitesh Saxena. 2016. A sound for a sound: Mitigating acoustic side channel attacks on password keystrokes with active sounds. In *International Conference on Financial Cryptography and Data Security*. Springer, 346-364.

[4] S. A. Anand and N. Saxena. 2019. Noisy Vibrational Pairing of IoT Devices. *IEEE Transactions on Dependable and Secure Computing* 16, 3 (May 2019).

[5] S. M. Bellovin and M. Merritt. 1992. Encrypted key exchange: password-based protocols secure against dictionary attacks. In *Proceedings 1992 IEEE Computer Society Symposium on Research in Security and Privacy*.

[6] Joseph Bonneau, Cormac Herley, Paul C. van Oorschot, and Frank Stajano. 2012. The Quest to Replace Passwords: A Framework for Comparative Evaluation of Web Authentication Schemes. In *2012 IEEE Symposium on Security and Privacy*.

[7] John H Borghi. 1965. Distribution of Human Reaction Time. *Perceptual and motor skills* 21, 1 (1965), 212-214.

[8] Victor Boyko, Philip MacKenzie, and Sarvar Patel. 2000. Provably secure password-authenticated key exchange using Diffie-Hellman. In *International Conference on the Theory and Applications of Cryptographic Techniques*.

[9] John Brooke. 1996. SUS: A Quick and Dirty Usability Scale. In *Usability Evaluation in Industry*. Taylor & Francis, Chapter 21.

[10] Vivek Dhakal, Anna Maria Feit, Per Ola Kristensson, and Antti Oulasvirta. 2018. Observations on Typing from 136 Million Keystrokes. In *Proceedings of the 2018 CHI Conference on Human Factors in Computing Systems*.

[11] D. Dolev and A. Yao. 1983. On the Security of Public Key Protocols. *IEEE Transactions on Information Theory* 29, 2 (1983).

[12] Nirnimesh Ghose, Loukas Lazos, and Ming Li. 2018. SFIRE: Secret-Free-in-band Trust Establishment for COTS Wireless Devices. In *IEEE INFOCOM—IEEE Conference on Computer Communications*.

[13] Google Nest. 2019. What makes a Nest thermostat a Nest thermostat? https://store.google.com/us/magazine/compare_thermostats?hl=en-US.

[14] J. Han, A. J. Chung, M. K. Sinha, M. Harishankar, S. Pan, H. Y. Noh, P. Zhang, and P. Tague. 2018. Do You Feel What I Hear? Enabling Autonomous IoT Device Pairing Using Different Sensor Types. In *2018 IEEE Symposium on Security and Privacy*.

[15] Ken Hinckley. 2003. Synchronous Gestures for Multiple Persons and Computers. In *Proceedings of the 16th Annual ACM Symposium on User Interface Software and Technology*.

[16] Honeywell Home. 2019. T9 Wi-Fi Smart Thermostat. https://www.honeywellstore.com/store/products/honeywell-home-t9-Wi-Fi-smartthermostat-rcht9510wfw2001w.htm.

[17] Michael Horowitz. 2019. Wi-Fi Encryption. https://routersecurity.org/wepwpawpa2.php.

[18] IEEE. 2009. IEEE Standard Specification for Password-Based Public-Key Cryptographic Techniques. *IEEE Std 1363.2-2008* (2009), 1-140.

[19] Suman Jana, Sriram Nandha Premnath, Mike Clark, Sneha K. Kasera, Neal Patwari, and Srikanth V. Krishnamurthy. 2009. On the Effectiveness of Secret Key Extraction from Wireless Signal Strength in Real Environments. In *Proceedings of the 15th Annual International Conference on Mobile Computing and Networking*.

[20] Ari Juels and Martin Wattenberg. 1999. A Fuzzy Commitment Scheme. In *Proceedings of the 6th ACM Conference on Computer and Communications Security*.

[21] Sunjun Kim, Byungjoo Lee, and Antti Oulasvirta. 2018. Impact Activation Improves Rapid Button Pressing. In *Proceedings of the 2018 CHI Conference on Human Factors in Computing Systems*.

[22] James R. Lewis. 1995. IBM Computer Usability Satisfaction Questionnaires: Psychometric Evaluation and Instructions for Use. *Int. J. Hum.-Comput. Interact.* 7, 1 (1995).

[23] Xiaopeng Li, Fengyao Yan, Fei Zuo, Qiang Zeng, and Lannan Luo. 2019. Touch Well Before Use: Intuitive and Secure Authentication for IoT Devices. In *The 25th Annual International Conference on Mobile Computing and Networking*.

[24] Hubert W. Lilliefors. 1967. On the Kolmogorov-Smirnov Test for Normality with Mean and Variance Unknown. *J. Amer. Statist. Assoc.* 62, 318 (1967).

[25] H. Liu, Y. Wang, J. Yang, and Y. Chen. 2013. Fast and Practical Secret Key Extraction by Exploiting Channel Response. In *IEEE INFOCOM—IEEE Conference on Computer Communications*.

[26] Sathiya Kumaran Mani, Ramakrishnan Durairajan, Paul Barford, and Joel Sommers. 2018. A System for Clock Synchronization in an Internet of Things. *arXiv preprint arXiv:1806.02474* (2018).

[27] Shrirang Mare, Andrés Molina Markham, Cory Cornelius, Ronald Peterson, and David Kotz. 2014. ZEBRA: Zero-Effort Bilateral Recurring Authentication. In *2014 IEEE Symposium on Security and Privacy*.

[28] Shrirang Mare, Reza Rawassizadeh, Ronald Peterson, and David Kotz. 2018. SAW:Wristband-based Authentication for Desktop Computers. *Proceedings of the ACM on Interactive, Mobile, Wearable and Ubiquitous Technologies* 2, 3 (2018), 1-29.

[29] Suhas Mathur, Wade Trappe, Narayan Mandayam, Chunxuan Ye, and Alex Reznik. 2008. Radio-telepathy: Extracting a Secret Key from an Unauthenticated Wireless Channel. In *Proceedings of the 14th ACM International Conference on Mobile Computing and Networking*.

[30] Rene Mayrhofer and Hans Gellersen. 2009. Shake Well Before Use: Intuitive and Secure Pairing of Mobile Devices. *IEEE Transactions on Mobile Computing* 8, 6 (2009).

[31] J. M. McCune, A. Perrig, and M. K. Reiter. 2005. Seeing-Is-Believing: Using Camera Phones for Human-Verifiable Authentication. In *2005 IEEE Symposium on Security and Privacy*.

[32] Markus Miettinen, N. Asokan, Thien Duc Nguyen, Ahmad-Reza Sadeghi, and Majid Sobhani. 2014. Context-Based Zero-Interaction Pairing and Key Evolution for Advanced Personal Devices. In *Proceedings of the 2014 ACM SIGSAC Conference on Computer and Communications Security*.

[33] Fabian Monrose and Aviel Rubin. 1997. Authentication via Keystroke Dynamics. In *Proceedings of the 4th ACM SIGSAC Conference on Computer and Communications Security*.

[34] Motiv Inc. 2019. Motiv Ring. https://mymotiv.com/.

[35] Kenneth H. Norwich. 1993. *Information, Sensation and Perception*. Academic Press.

[36] Shwetak N. Patel, Jeffrey S. Pierce, and Gregory D. Abowd. 2004. A Gesture-based Authentication Scheme for Untrusted Public Terminals. In *Proceedings of the 17th Annual ACM Symposium on User Interface Software and Technology*.

[37] N. Patwari, J. Croft, S. Jana, and S. K. Kasera. 2010. High-Rate Uncorrelated Bit Extraction for Shared Secret Key Generation from Channel Measurements. *IEEE Transactions on Mobile Computing* 9, 1 (2010).

[38] I. Reed and G. Solomon. 1960. Polynomial Codes Over Certain Finite Fields. *J. Soc. Indust. Appl. Math.* 8, 2 (1960).

[39] Masoud Rostami, Ari Juels, and Farinaz Koushanfar. 2013. Heart-to-Heart (H2H): Authentication for Implanted Medical Devices. In *Proceedings of the 2013 ACM SIGSAC Conference on Computer and Communications Security*.

[40] Andrew Rukhin, Juan Soto, James Nechvatal, Miles Smid, and Elaine Barker. 2001. *A Statistical Test Suite for Random and Pseudorandom Number Generators for Cryptographic Applications*. Technical Report.

[41] Nitesh Saxena, Jan-Erik Ekberg, Kari Kostiainen, and N. Asokan. 2006. Secure Device Pairing Based on a Visual Channel. In *2006 IEEE Symposium on Security and Privacy*.

[42] D. Schürmann and S. Sigg. 2013. Secure Communication Based on Ambient Audio. *IEEE Transactions on Mobile Computing* 12, 2 (February 2013).

[43] M. Sethi, M. Antikainen, and T. Aura. 2014. Commitment-Based Device Pairing with Synchronized Drawing. In *2014 IEEE International Conference on Pervasive Computing and Communications*.

[44] Statista. 2016. Internet of Things (IoT) Connected Devices Installed Base Worldwide from 2015 to 2025 (in Billions). https://www.statista.com/statistics/471264/iot-number-of-connected-devices-worldwide/.

[45] Wei Wang, Lin Yang, and Qian Zhang. 2018. Resonance-Based Secure Pairing for Wearables. *IEEE Transactions on Mobile Computing* 17, 11 (2018).

[46] Wei Xi, Chen Qian, Jinsong Han, Kun Zhao, Sheng Zhong, Xiang-Yang Li, and Jizhong Zhao. 2016. Instant and Robust Authentication and Key Agreement Among Mobile Devices. In *Proceedings of the 2016 ACM SIGSAC Conference on Computer and Communications Security*.

[47] Zhenyu Yan, Qun Song, Rui Tan, Yang Li, and Adams Wai Kin Kong. 2019. Towards Touch-to-Access Device Authentication Using Induced Body Electric Potentials. In *The 25th Annual International Conference on Mobile Computing and Networking*.

[48] Jiansong Zhang, ZeyuWang, Zhice Yang, and Qian Zhang. 2017. Proximity Based IoT Device Authentication. In *IEEE INFOCOM—IEEE Conference on Computer Communications*.

[49] Tengxiang Zhang, Xin Yi, Ruolin Wang, Yuntao Wang, Chun Yu, Yiqin Lu, and Yuanchun Shi. 2018. Tap-to-Pair: Associating Wireless Devices with Synchronous Tapping. *Proc. ACM Interact. Mob. Wearable Ubiquitous Technol.* 2, 4 (December 2018).

What is claimed is:

1. A method for secure and usable pairing for heterogeneous IoT devices, comprising:
    conducting a universal operation sensing step with the mobile device having an inertial sensor, to sense a user's physical operations on an associated IoT device without requiring the IoT device to have an inertial sensor;
    creating event evidence at the IoT device and at the mobile device of a physical operation on the IoT device; and
    comparing the event evidence to establish mutual authentication for the IoT device and the mobile device, and to complete pairing of the IoT device with the mobile device; and wherein
    the mobile device is a smart device comprising one of a smartphone, fitness tracker, smartwatch, or smart ring, and has an inertial measurement unit (IMU) sensor which can measure triaxial acceleration and triaxial angular velocity;
    conducting a universal operation sensing step comprises at least one of pressing a button, twisting a knob, or swiping a touchscreen of the IoT device;
    creating event evidence at the IoT device includes using an IoT device internal clock to produce an IoT device timestamp of a user's physical operations on the IoT device;
    creating event evidence at the mobile device includes producing a mobile device timestamp of sensed measured acceleration and angular velocity events;
    creating event evidence further includes using the IoT device and mobile device timestamps to describe salient points of a user's physical operations on the IoT device; and
    the method further includes using faithful fuzzy commitment protocol to compare the IoT device and mobile device timestamps, wherein the faithful fuzzy commitment protocol includes using intervals between salient points for encoding, in order to mutually authenticate the mobile device and the IoT device, where distances between encodings are below a predetermined threshold in order to establish mutual authentication per the faithful fuzzy commitment protocol.

2. The method as in claim 1, wherein creating event evidence at the mobile device includes a user holding the mobile device in one of the user's hands while using that same hand to conduct the physical operation on the IoT device, and further includes producing a mobile device timestamp of sensed measured acceleration and angular velocity events.

3. The method as in claim 1, further including:
    connecting the mobile device having an inertial sensor onto a given password-protected wireless network; and
    using password-authenticated key exchange after mutual authentication, to pair the IoT device with the associated mobile device so that a password for the password-protected wireless network is passed to the IoT device.

4. The method as in claim 1, wherein pressing a button comprises pressing a button a plurality of times with one or more random pauses added, twisting a knob comprises twisting a knob a plurality of times with one or more random pauses added, and swiping a touchscreen comprises swiping the touchscreen of the IoT device a plurality of times with one or more random pauses added.

5. The method as in claim 1, wherein creating event evidence includes sampling the IoT device using a sampling rate in a range of from 10 Hz to 100 Hz to determine whether there has been at least one of pressing a button, twisting a knob, or swiping a touchscreen of the IoT device.

6. The method as in claim 1, wherein the number of intervals used for creating event evidence for comparing is at least six.

7. An Internet-of-Things (IoT) smart device for pairing with a second smart device, comprising an IoT smart device having one or more processors programmed for:
    (a) creating an IoT smart device sequence of timestamp data in response to physical operations of a user on the IoT smart device while the user holds the second smart device having an inertial sensor which can measure triaxial acceleration and triaxial angular velocity,
    (b) communicating with the second smart device to receive therefrom a second smart device sequence of timestamp data in response to the physical operations of the user on the IoT smart device, wherein each sequence of the timestamps are used to describe salient points of the user's physical operations, and produced of sensed measured acceleration and angular velocity events, (c) comparing the IoT smart device sequence of timestamp data with the second smart device sequence of timestamp data using cryptographic protocol comprising one of faithful fuzzy commitment or H2H protocol to ensure correlation of the two sequences within a predetermined threshold, wherein the faithful fuzzy commitment protocol includes using intervals between salient points for encoding, in order to mutually authenticate the mobile device and the IoT smart device, where distances between encodings are below the predetermined threshold in order to establish mutual authentication per the faithful fuzzy commitment protocol, and (d) pairing the IoT smart device with the second smart device once the predetermined threshold is met to ensure correlation of the two sequences within a threshold.

8. The Internet-of-Things (IoT) smart device as in claim 7, wherein the IoT smart device includes at least one of a button for pressing, a knob for twisting, and a touchscreen for swiping, for conduct of physical operations of the user on the IoT smart device.

\* \* \* \* \*